United States Patent
Oxley et al.

(10) Patent No.: US 9,802,657 B2
(45) Date of Patent: Oct. 31, 2017

(54) POWERED DEPLOYABLE SPOILER ASSEMBLY FOR MOTOR VEHICLES

(71) Applicant: MAGNA CLOSURES INC., Newmarket (CA)

(72) Inventors: Peter Lance Oxley, Mount Albert (CA); Vadym Podkopayev, Bradford (CA)

(73) Assignee: MAGNA CLOSURES INC., Newmarket (CA)

( * ) Notice: Subject to any disclaimer, the term of this patent is extended or adjusted under 35 U.S.C. 154(b) by 0 days.

(21) Appl. No.: 14/955,256

(22) Filed: Dec. 1, 2015

(65) Prior Publication Data

US 2016/0159412 A1    Jun. 9, 2016

Related U.S. Application Data

(60) Provisional application No. 62/087,654, filed on Dec. 4, 2014.

(51) Int. Cl.
*B62D 35/00* (2006.01)

(52) U.S. Cl.
CPC .................................. *B62D 35/007* (2013.01)

(58) Field of Classification Search
CPC .................................................... B62D 35/007
See application file for complete search history.

(56) References Cited

U.S. PATENT DOCUMENTS

| | | | |
|---|---|---|---|
| 5,120,105 A * | 6/1992 | Brin | B62D 35/007 296/180.5 |
| 6,193,302 B1 | 2/2001 | Won et al. | |
| 7,226,117 B2 | 6/2007 | Preiss | |
| 7,481,482 B2 | 1/2009 | Grave et al. | |
| 7,686,384 B2 | 3/2010 | Paul et al. | |
| 8,033,593 B2 | 10/2011 | Ramin et al. | |
| 8,177,288 B2 | 5/2012 | Molnar et al. | |
| 2015/0091325 A1 | 4/2015 | Shiga et al. | |
| 2015/0175223 A1 | 6/2015 | Jeong et al. | |

FOREIGN PATENT DOCUMENTS

| | | |
|---|---|---|
| DE | 102012108048 A1 | 1/2014 |
| DE | 102013106401 A1 | 12/2014 |
| EP | 2357121 A2 | 8/2011 |
| GB | 2533576 A * | 6/2016 ........... B62D 35/007 |

* cited by examiner

*Primary Examiner* — Glenn Dayoan
*Assistant Examiner* — Melissa A Black
(74) *Attorney, Agent, or Firm* — Dickinson Wright PLLC

(57) ABSTRACT

A powered deployable spoiler assembly includes a support member adapted for mounting to a motor vehicle and a spoiler panel disposed in a recessed segment of the support member. A pair of power-operated drive units interconnect the spoiler panel to the support member and are operable to move the spoiler panel between a non-deployed position, a first deployed position to provide aerodynamic assistance at a first vehicle speed, and a second deployed position to provide augmented aerodynamic assistance at a second higher vehicle speed. Each drive unit defines a guide slot and includes a stanchion fixed to the spoiler panel and a follower assembly fixed to the stanchion and disposed for movement within the guide slot. Electric motors are coupled to rotary-to-linear conversion mechanisms for converting rotation into translation of the follower assemblies to control movement of the spoiler panel.

20 Claims, 22 Drawing Sheets

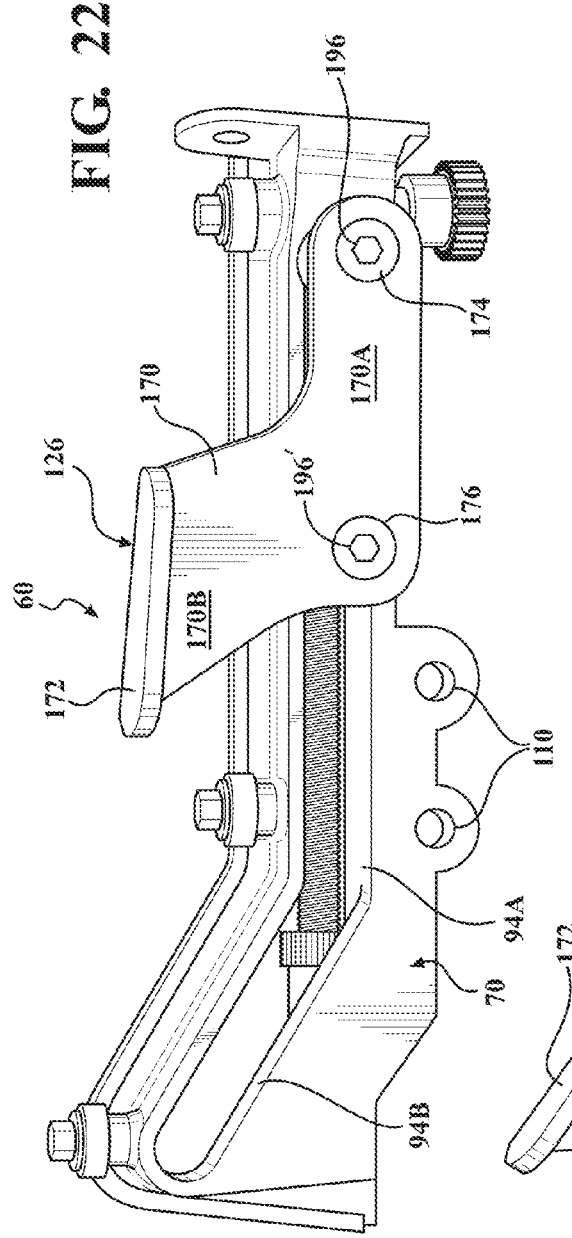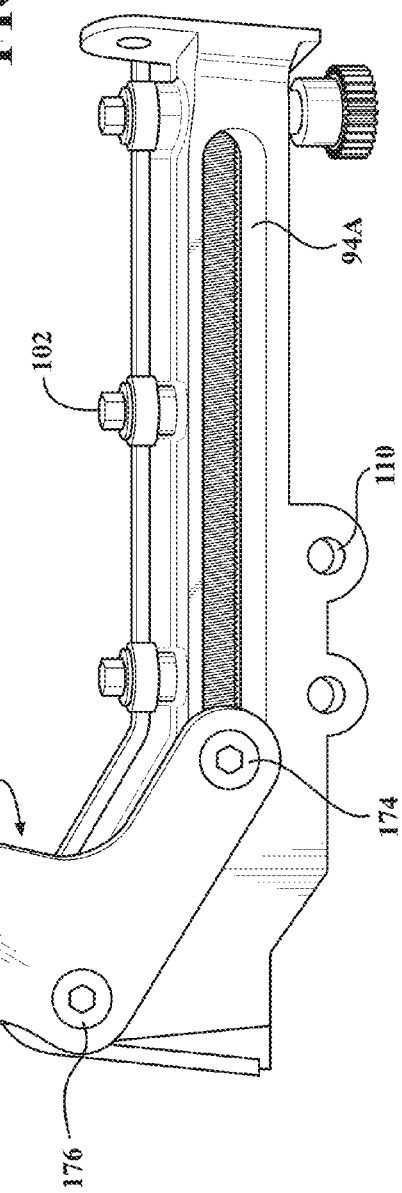

POWERED DEPLOYABLE SPOILER ASSEMBLY FOR MOTOR VEHICLES

CROSS REFERENCE TO RELATED APPLICATIONS

This application claims the benefit of U.S. Provisional Application No. 62/087,654 filed Dec. 4, 2014. The entire disclosure of the above application is incorporated herein by reference.

FIELD

The present disclosure relates generally to deployable spoilers for motor vehicles and, more particularly, to a power-operated deployable spoiler assembly adapted for installation on a rear roof portion of a motor vehicle having a liftgate.

BACKGROUND

This section provides background information related to the present disclosure which is not necessarily prior art.

In view of increased consumer demand for motor vehicles with improved fuel efficiency as well as improved road handling, a greater emphasis is now placed on designing modern vehicles with improved aerodynamics. In an effort to reduce aerodynamic drag and lift, it is known to equip motor vehicles with a deployable airfoil, commonly referred to as a spoiler, that is moveable between a retracted (i.e. stowed) position and an extended (i.e. deployed) position, typically in response to a vehicular operating characteristic such as, for example, the vehicle road speed. In most systems, the deployable spoiler is driven between its stowed and deployed positions by a powered drive unit.

Many deployable spoiler assemblies have been developed for rear-wheel drive sports cars and are configured to be integrated into the rear decklid. Examples of such powered rear spoiler devices are shown in U.S. Pat. Nos. 7,481,482, 7,686,384 and 8,033,593 and each utilizes a central electric motor to drive a pair of laterally-spaced linkage mechanisms attached to opposite ends of the spoiler panel. However, with increased popularity of cross-over and SUV or hatchback type vehicles, alternative powered spoiler devices have been designed for mounting to a rear portion of the roof and which accommodate pivotal movement of a hatch or liftgate. In this regard, U.S. Pat. No. 6,193,302 discloses a deployable rear spoiler device configured to move the spoiler panel vertically between stored and deployed positions relative to the roof of an SUV or hatchback type vehicle equipped with a pivotable liftgate. Alternative arrangements for powered rear spoiler devices configured for use with cross-over and SUV type vehicles are disclosed in U.S. Pat. No. 7,226,117 and German Publication No. DE102012108048A1.

While such powered rear spoiler devices are generally satisfactory for their intended purpose, an on-going need exists to develop less complicated alternatives that reduce complexity, cost and packaging while providing enhanced operation and modularity.

SUMMARY

This section provides a general summary of the present disclosure and is not intended to be a comprehensive disclosure of its full scope or all of its aspects, objectives, features and advantages.

It is an aspect of the present disclosure to provide a powered deployable spoiler assembly for use with motor vehicles.

It is a related aspect to provide a powered deployable spoiler assembly configured to be mounted to a rear portion of a motor vehicle equipped with a pivotable rear closure member.

It is another related aspect to mount the powered deployable spoiler assembly to the closure member. As an alternative, it is another aspect to mount the powered deployable spoiler assembly to a roof portion of the motor vehicle.

It is another related aspect to provide a powered deployable spoiler assembly configured to be used with SUV, hatchback, and cross-over type vehicles.

It is an aspect of the present disclosure to provide a powered deployable spoiler assembly having an elongated spoiler panel and a pair of power-operated drive units arranged to move the spoiler panel between a non-deployed position and at least one deployed position. Preferably a first deployed position provides aerodynamic assistance at a first vehicle speed and a second deployed position provides augmented aerodynamic assistance at a second, higher vehicle speed.

As a related aspect, the powered deployable spoiler assembly of the present disclosure is configured to reduce drag when the spoiler panel is located in its first deployed position and to reduce lift when the spoiler panel is located in its second deployed position.

It is another aspect of the present disclosure to provide such a powered deployable spoiler assembly with a simplified design compared to known systems, that is highly efficient aerodynamically, and is packaged in a compact configuration.

It is yet another aspect of the present disclosure to provide such a powered deployable spoiler assembly that can be configured as an original equipment product, as part of a liftgate assembly, or as an aftermarket product for use with vehicles equipped with liftgates.

In accordance with these and other aspects, features and objectives, the present disclosure is generally directed to a powered deployable spoiler assembly having an elongated spoiler panel arranged to extend across a rear portion of a motor vehicle, a pair of laterally-spaced power-operated drive units attached to opposite ends of the spoiler panel, and an active spoiler control system for controlling movement of the spoiler panel relative to the rear portion of the motor vehicle between a non-deployed position and at least one deployed position providing enhanced aerodynamic efficiency for improved fuel economy and/or improved tractive performance.

In accordance with an embodiment, the powered deployable spoiler assembly of the present disclosure includes a support member configured to be mounted to a mounting portion of a motor vehicle, a spoiler panel disposed in a recessed segment of the support member, and at least one power-operated drive unit interconnecting the spoiler panel to the support member and which is operable to move the spoiler panel between a stowed position and at least one deployed position relative to the support member. The power-operated drive unit includes a housing adapted to be fixed to the support member and which defines a guide slot, a stanchion adapted to be fixed to the spoiler panel, a follower assembly mounted to the stanchion and disposed within the guide slot, and a powered actuator for moving the stanchion relative to the housing so as to move the spoiler panel between its stowed and deployed position. In one embodiment, the powered actuator includes an electric motor, and a rotary-to-linear conversion device for converting rotation of the motor output into translation of the follower assembly within the guide slot so as to move the spoiler panel between its stowed and deployed positions.

In accordance with the powered deployable spoiler assembly of the present disclosure, the rotary-to-linear conversion device is a spindle drive mechanism having a leadscrew rotatably driven by the motor output, and a drive nut in threaded engagement with the leadscrew and being fixed to the follower assembly.

In accordance with the powered deployable spoiler assembly of the present disclosure, the power-operated drive unit further includes a pair of power-operated drive units mounted to opposite ends of the support member and drivingly connected to opposite ends of the spoiler panel so as to control movement of the spoiler panel between its stowed and deployed positions.

In accordance with the deployable spoiler assembly of the present disclosure, the power-operated drive units further include a reduction gearset operably disposed between the motor shaft and the leadscrew. The reduction gearset comprises a worm gearset including a worm gear fixed for common rotation with the motor shaft and a worm wheel fixed for common rotation with the leadscrew and which is meshed with the worm gear.

In accordance with the powered deployable spoiler assembly of the present disclosure, the guide slot in each of the housings includes a first slot segment and a second slot segment, wherein location of the follower assemblies in close proximity to a terminal end of the first slot segments locates the stanchions in a retracted position so as to locate the spoiler panel in its stowed position, and wherein location of the follower assemblies in close proximity to a terminal end of the second slot segments locates the stanchions in an extended position so as to locate the spoiler panel in its deployed position. The second slot segment of the guide slots is angulated relative to the first slot segment such that the spoiler panel is disposed in a tilted orientation relative to the support member when located in its deployed position.

In accordance with the powered deployable spoiler assembly of the present disclosure, the deployed position includes a first or partially deployed position that is provided between the stowed position and a second or fully deployed position. The first deployed position is established when the follower assembly is located at an intersection of the first and second slot segments of the guide slot. The spoiler panel is operable in the first deployed position to reduce drag on the vehicle while the spoiler panel is operable in the second deployed position to reduce lift of the vehicle and generate a downwardly directed force.

In accordance with an embodiment of the powered deployable spoiler assembly, the support member is associated with a rear closure member configured for attachment to a body portion of the motor vehicle and which is moveable between a closed position and an open position. The rear closure member may be a pivotable liftgate such that the support member and the liftgate define a liftgate module configured for attachment to the body portion of the motor vehicle.

In accordance with another embodiment of the powered deployable spoiler assembly, the support member is adapted to be mounted to a roof portion of the motor vehicle and a moveable rear closure member is attached to a body portion of the motor vehicle in proximity to said support member.

The powered deployable spoiler assembly of the present disclosure further includes a control system having at least one sensor operably detecting the position of one of the motor and the spoiler panel, and an active spoiler control unit for controlling movement of the spoiler panel in response to the position signal and at least one vehicle input. The vehicle input may be a vehicle speed signal.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations and are not intended to limit the scope of the present disclosure.

FIGS. 22 through 25 are further views of the drive unit; and

Corresponding reference numerals indicate corresponding parts throughout the second views of the drawings.

DETAILED DESCRIPTION

Figure 1:
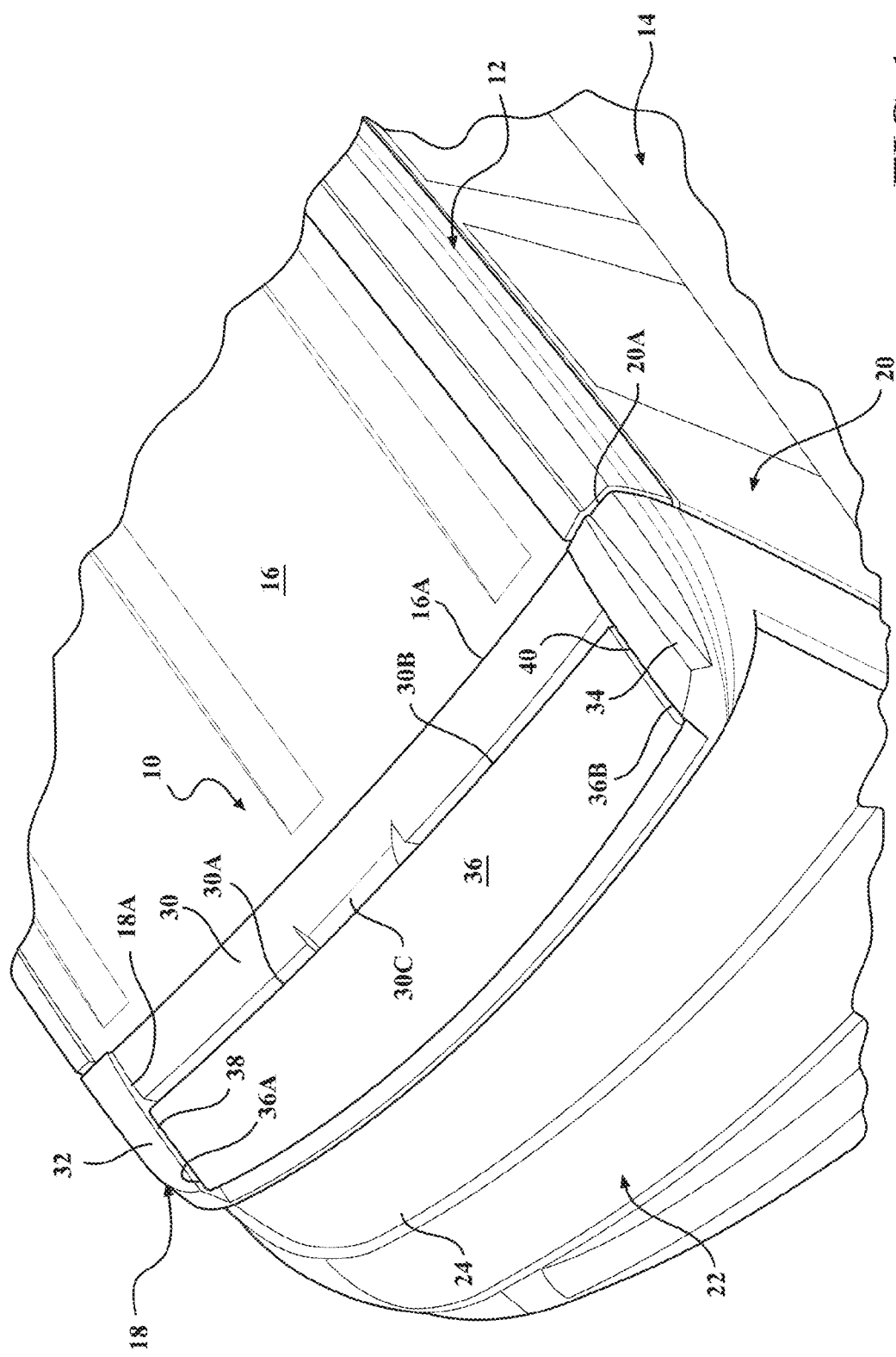
FIG. 1 is a perspective view of a rear portion of an example motor vehicle having a rear liftgate and which is equipped with a powered deployable spoiler assembly constructed in accordance with the teachings of the present disclosure and showing the rear spoiler located in a stowed position.

Example embodiments will now be described more fully with reference to the accompanying drawings. The particular example embodiments described herein are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that the specific details need not be employed, that example embodiments may be embodied in many different forms and that neither should be construed to limit the scope of the disclosure. In some example embodiments, well-known processes, well-known device structures, and well-known technologies are not described in detail.

As will be detailed hereinafter with greater specificity, the present disclosure is related to a powered deployable spoiler assembly of the type well-suited for installation on the rear portion of a motor vehicle. The powered deployable spoiler assembly is shown a described in association with a motor vehicle having a pivotable hatch, liftgate or decklid as its rear closure member and is configured to be installed, either as a factory-installed unit or an aftermarket device, to a rear portion of the vehicle so as to be located in proximity to the hatch, decklid or liftgate. The powered deployable spoiler assembly can be operably installed to the vehicle's roof or integrated into the liftgate or hatch, or other closure members (i.e., decklid), to provide a closure module. A control system is provided in association with the powered deployable spoiler assembly which together define an "active" spoiler assembly.

With initial reference primarily to FIGS. 1-5, a powered deployable spoiler assembly 10 is shown in association with a motor vehicle 12 and is constructed in accordance with the teachings of the present disclosure. Motor vehicle 12 is shown, in the non-limiting example disclosed, to be a cross-over, hatchback, or SUV type vehicle having a body 14 defining a roof 16 bounded by a driver-side side panel 18 and a passenger-side side panel 20. A rear closure member, shown as a hatchback or liftgate 22 is pivotally attached to body 14 to move between a closed position (shown) and an open position to selectively provide access to passenger space and/or storage space within vehicle 12. Liftgate 22 is intended to illustrate a moveable rear closure member and the specific structure and function disclosed herein is not intended to limit the present disclosure. Liftgate 22 is shown to include a window 24 and, while not shown, shall include a latch device, either of the manually-operated or power-activated type, for latching liftgate 22 in its closed position and unlatching liftgate 22 for movement toward its open position. While the present disclosure is not limited to the specific arrangement shown, liftgate 22 of vehicle 12 includes a top mounting portion 16A and side panel mounting portions 18A, 20A that are configured to accept installation of powered deployable assembly 10 thereon. Powered deployable spoiler assembly may be assembled as part of a liftgate module in association with liftgate 22, as part of a rear portion of vehicle body 14, or as a stand-alone add-on assembly.

Figure 2:
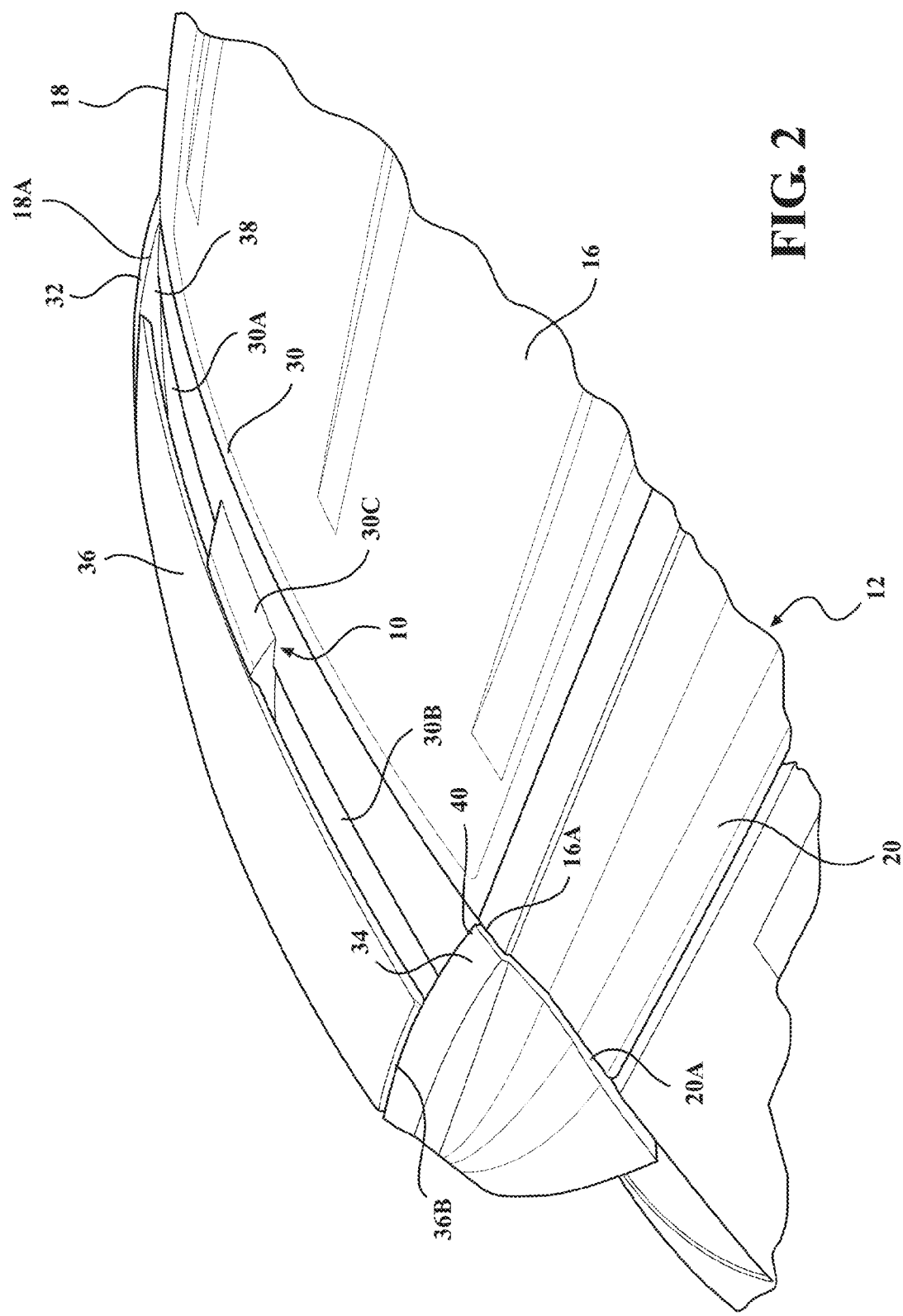
FIG. 2 is another perspective view of the motor vehicle equipped with the powered deployable spoiler assembly of the present disclosure also showing the rear spoiler in its stowed position.
Figure 3:
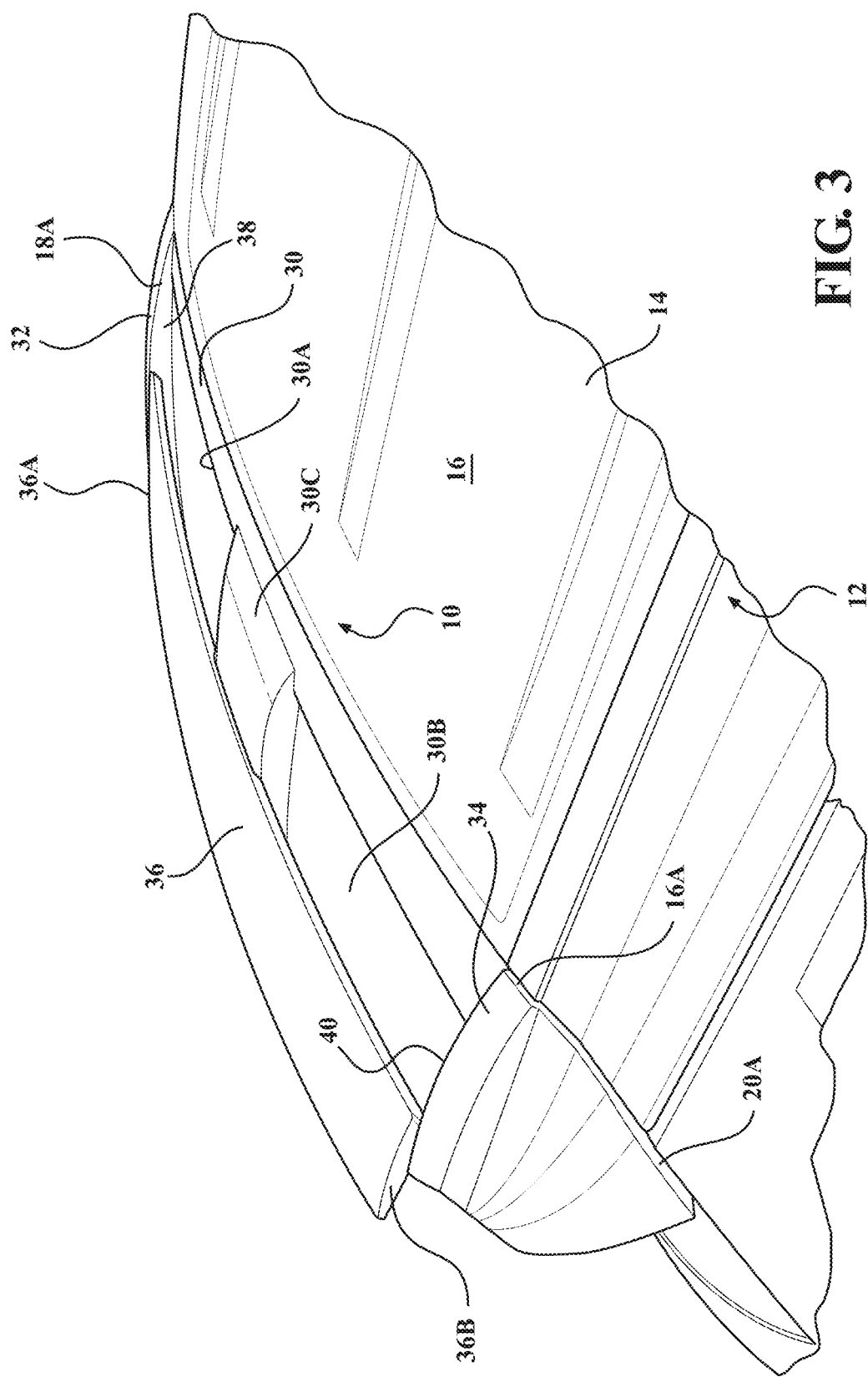
FIG. 3 is a perspective view similar to FIG. 2 but showing the rear spoiler extended to a first deployed position.
Figure 4:
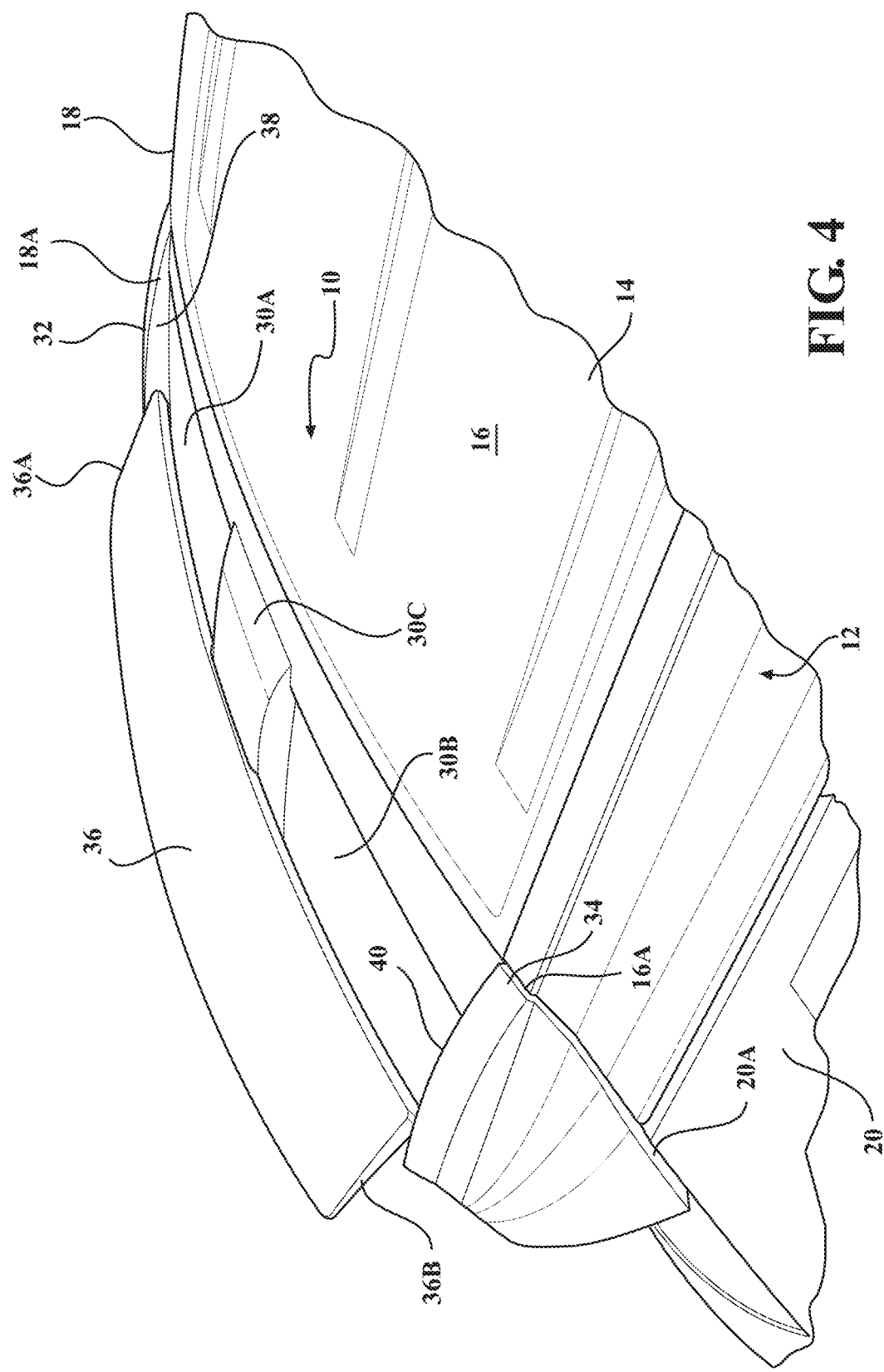
FIG. 4 is a perspective view similar to FIGS. 2 and 3 but showing the rear spoiler further extended to a second deployed position.
Figure 5:
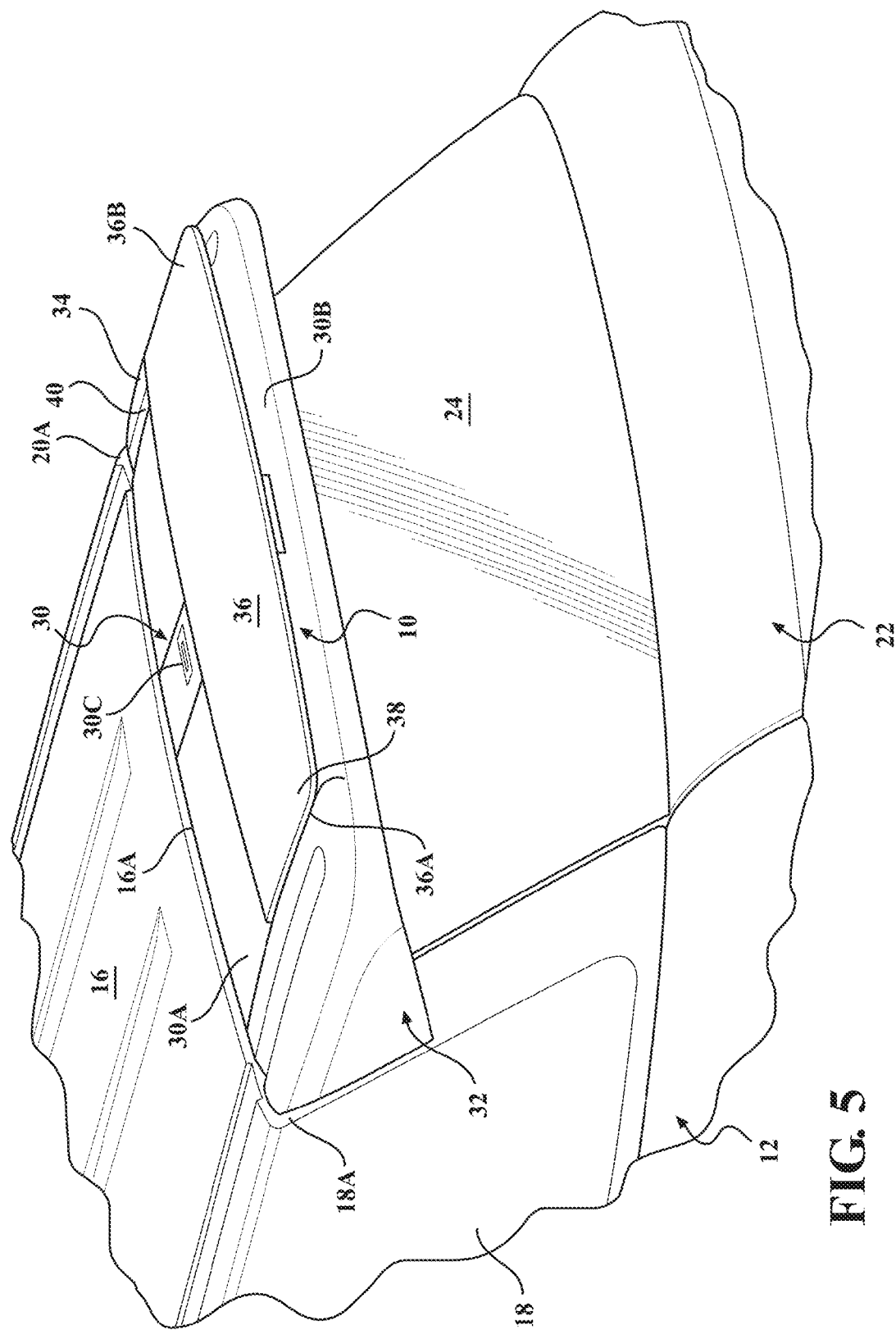
FIG. 5 is another perspective view of the rear portion of the motor vehicle showing the rear spoiler extended to a first deployed position.

With continued reference to FIGS. 1-5, powered deployable spoiler assembly, hereinafter referred to as active spoiler assembly 10, is shown to include a contoured and aesthetically-configured outer cover unit including a top cover 30, a first or driver-side edge cover 32 and a second or passenger-side edge cover 34. While disclosed as three distinct cover elements, the covers 30, 32, 34 could alternatively be configured as a common unit. Top cover 30 extends across the width of vehicle 12 and defines a first or driver-side recessed channel 30A, a second or passenger-side recessed channel 30B, and a raised central tunnel 30C which is configured to house vehicle accessories such as, for example, a reverse light unit, a wiper motor assembly, a window washer spray unit and/or electrical connectors. As will be detailed, active spoiler assembly 10 includes an air deflector, hereinafter referred to as spoiler panel 36, that is moveable relative to the cover unit between a non-deployed or "Stowed" position (FIGS. 1 and 2), a first deployed or "Aero" position (FIG. 3), and a second deployed or "Sport" position (FIG. 4). When spoiler panel 36 is located in its stowed position, it is retracted relative to recessed channels 30A, 30 B with its laterally-spaced end surfaces 36A, 36B aligned generally flush with inner edge surfaces 38, 40 of edge covers 32, 34. However, air flowing over roof 16 is permitted to flow under spoiler panel 36 and through recessed channels of 30A, 30B to be discharged therefrom. According to another embodiment, the leading edge of panel 36 can be moved in close proximity to the top cover 30, thereby closing channels 30A, 30B. In contrast, movement of spoiler panel 36 to its Aero position is shown in FIG. 3 to generally horizontally translate spoiler panel 36 outwardly relative to the cover unit and body 14 while concurrently vertically lifting spoiler panel 36 such that its laterally-spaced end surfaces 36A, 36B are raised relative to the inner edge surface 38, 40 of edge covers 32, 34. Finally, movement of spoiler panel 36 to its Sport position acts to further extend spoiler panel 36 relative to the cover unit and body 14 while also angularly displacing spoiler panel 36. The specific structural components and functional operations associated with active spoiler assembly 10 used to selectively move spoiler panel 36 between its three (3) distinct operational positions will now be detailed with reference to the remaining drawings.

Figure 6:
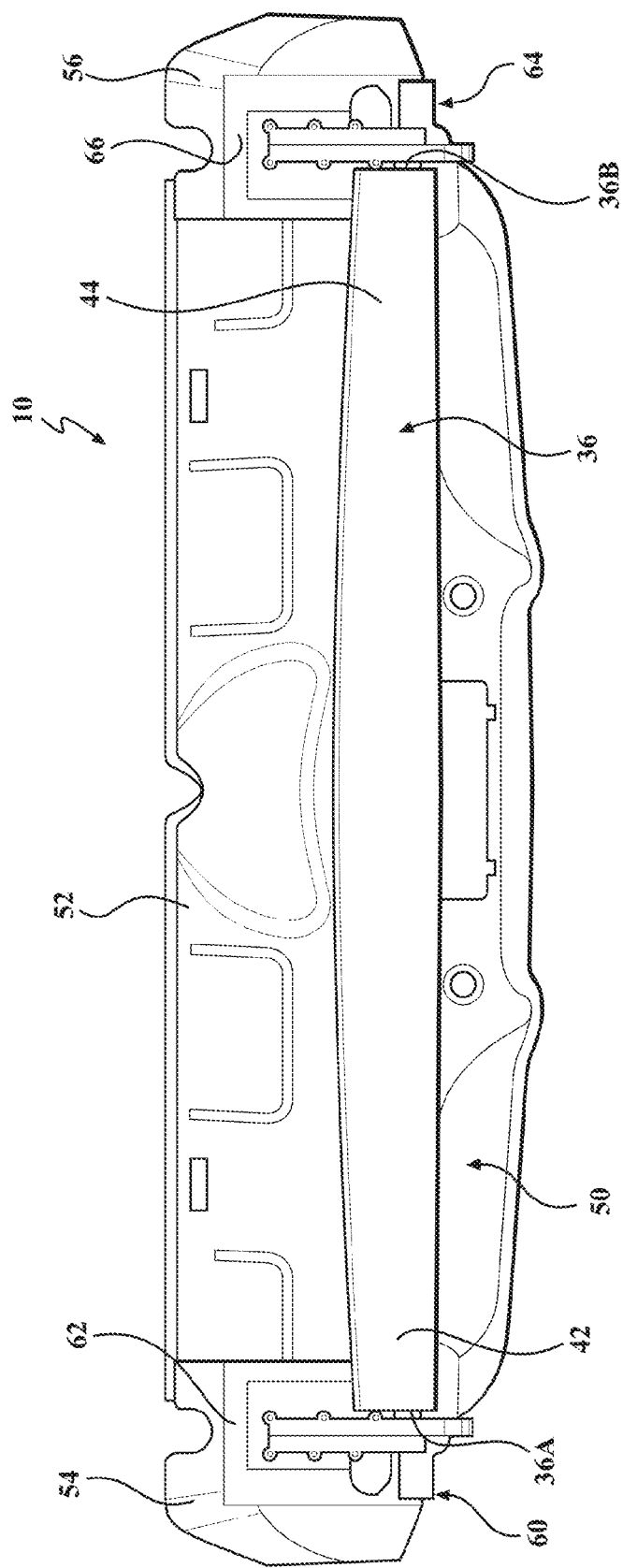
FIG. 6 is a top view of the powered deployable spoiler assembly of the present disclosure, removed from the vehicle and with various cover components removed for additional clarity showing the rear spoiler and driver-side and passenger-side drive units.
Figure 7:
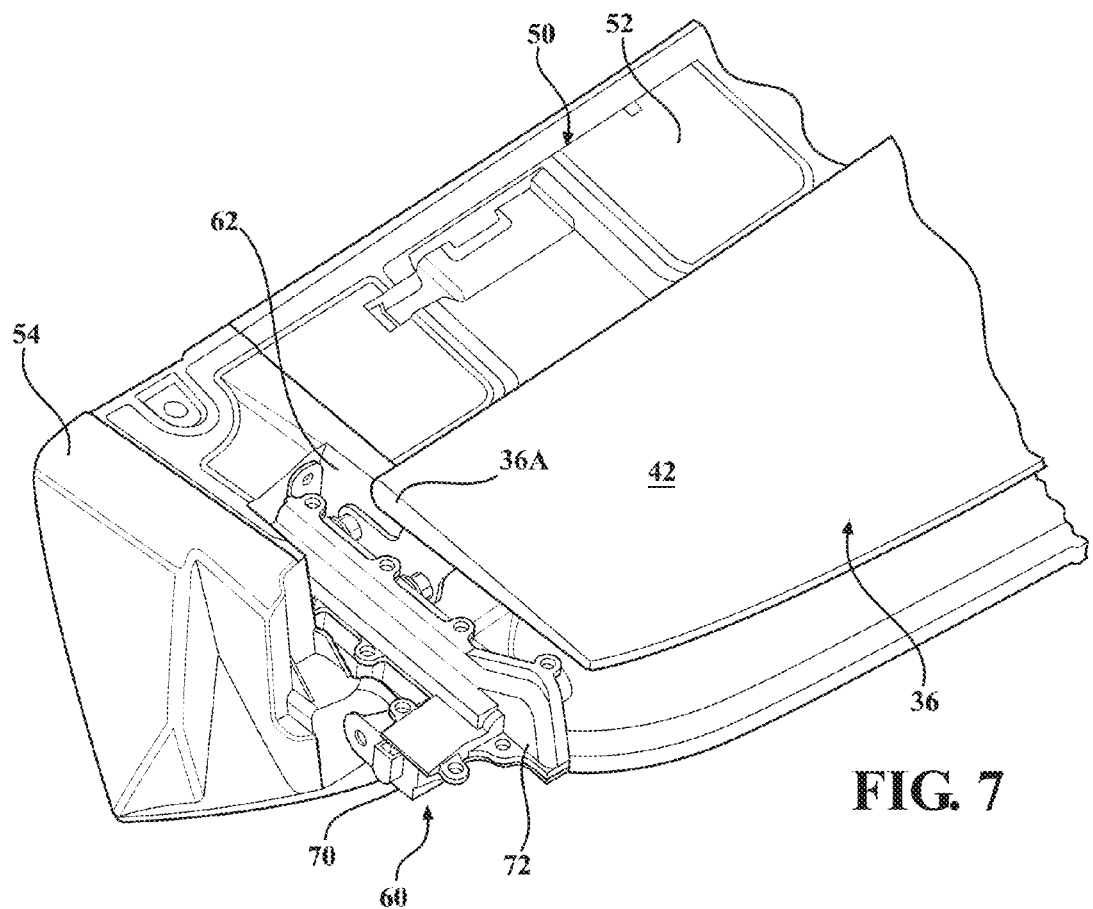
FIG. 7 illustrates a driver-side portion of the powered deployable spoiler assembly, with various cover components removed for clarity, and showing the driver-side drive unit interconnect to one end of the rear spoiler located in its stowed position.

Referring primarily to FIG. 6, spoiler assembly 10 is shown with top cover 30 and edge covers 32, 34 removed so as to illustrate a mounting panel 50 configured to be rigidly secured to closure member 22 or, in the alternative, to body 14 of vehicle 12, mounting panel 50 includes an elongated mounting section 52, a first or driver-side mounting section 54, and a second or passenger-side mounting section 56. Mounting panel 50 and covers 30, 32, 34 define a spoiler support structure. Mounting section 52 is adapted to be mounted to liftgate 22 or, in the alternative, to an end portion of roof 16 and is configured to permit top cover 30 to be mounted thereon. Driver-side mounting section 54 is configured to permit driver-side edge cover 32 to be mounted thereon while passenger-side mounting section 56 is configured to permit passenger-side edge cover 34 to be mounted thereon. In general, mounting panel 50 is a symmetrical component with its driver-side contour and mounting section 54 being a mirror-image of its passenger-side contour and mounting section 56. In the particular arrangement shown, active spoiler assembly 10 includes a first or driver-side drive unit 60 installed in a support chamber 62 formed in a driver-side mounting section 54, and a second or passenger-side drive unit 64 installed in a support chamber 66 formed in passenger-side mounting section 56 of mounting panel 50. As will be detailed, a first end segment 42 of spoiler panel 36 is fixed to a moveable component of driver-side drive unit 60 and a second end segment 44 of spoiler panel 36 is fixed to a moveable component of passenger-side drive unit 64.

The remaining FIGS. 7-25 are directed to disclosing in great detail the components, structure and function of driver-side drive unit 60. However, those skilled in the art will recognize and understand that passenger-side drive unit 64 is merely a mirror-image of driver-side drive unit 60 such that the following description is directly applicable to both of the drive units 60, 64.

Drive unit 60 generally includes a structural housing 70 and a cover 72 which together define an internal chamber 74. In particular, housing 70 includes an elongated plate segment 76 delineated by a first or outer flange segment 78 and a second or inner flange segment 80. Housing 70 also includes a transverse plate segment 82 delineated by a first transverse flange segment 84, a second transverse flange segment 86, and an end flange segment 88. As best seen from FIG. 20, first transverse flange segment 84 is interconnected to outer flange 78 and second transverse flange segment 86 is interconnected to inner flange segment 80 so as to define a motor cavity 90 and a spindle drive cavity 92. Inner flange segment 80 is shown to include an elongated guide slot 94 defining a generally horizontally-aligned first slot section 94A and an angled second slot section 94B. A plurality of housing mounting bores 98 are formed along the periphery of housing 70 that are adapted to align and mate with a similar plurality of cover apertures 100 formed in cover 72 and accept retention of suitable fasteners, such as rivets or mounting screws 102, to permit cover 72 to be attached to housing 70.

Figure 8:
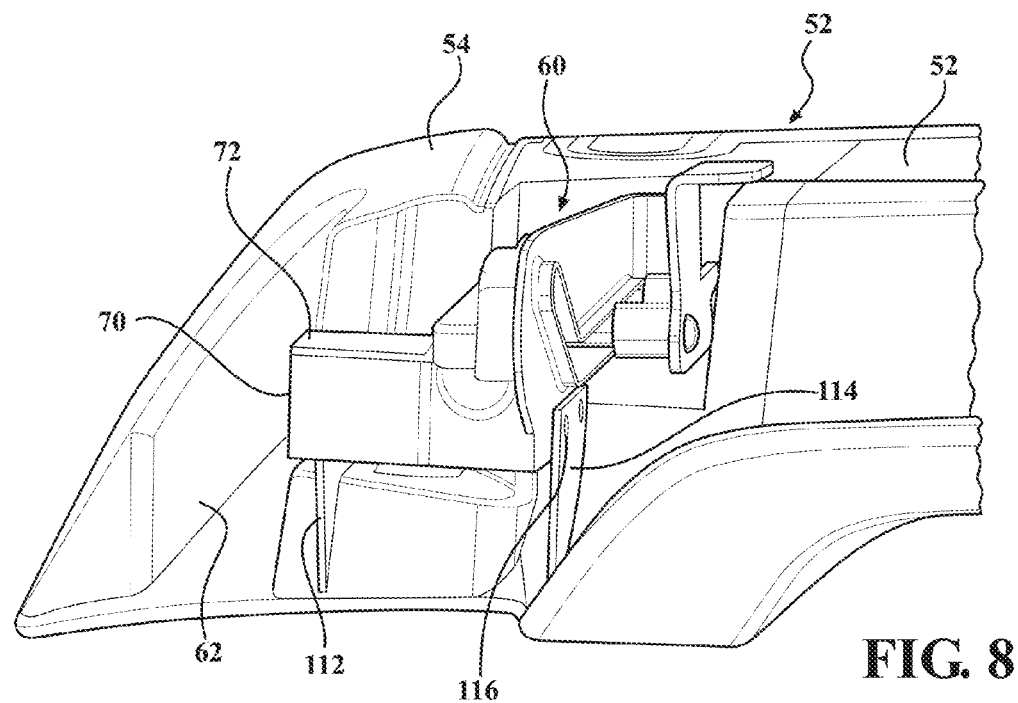
FIG. 8 is an end perspective view of the driver-side drive unit shown in FIG. 7.
Figure 9:
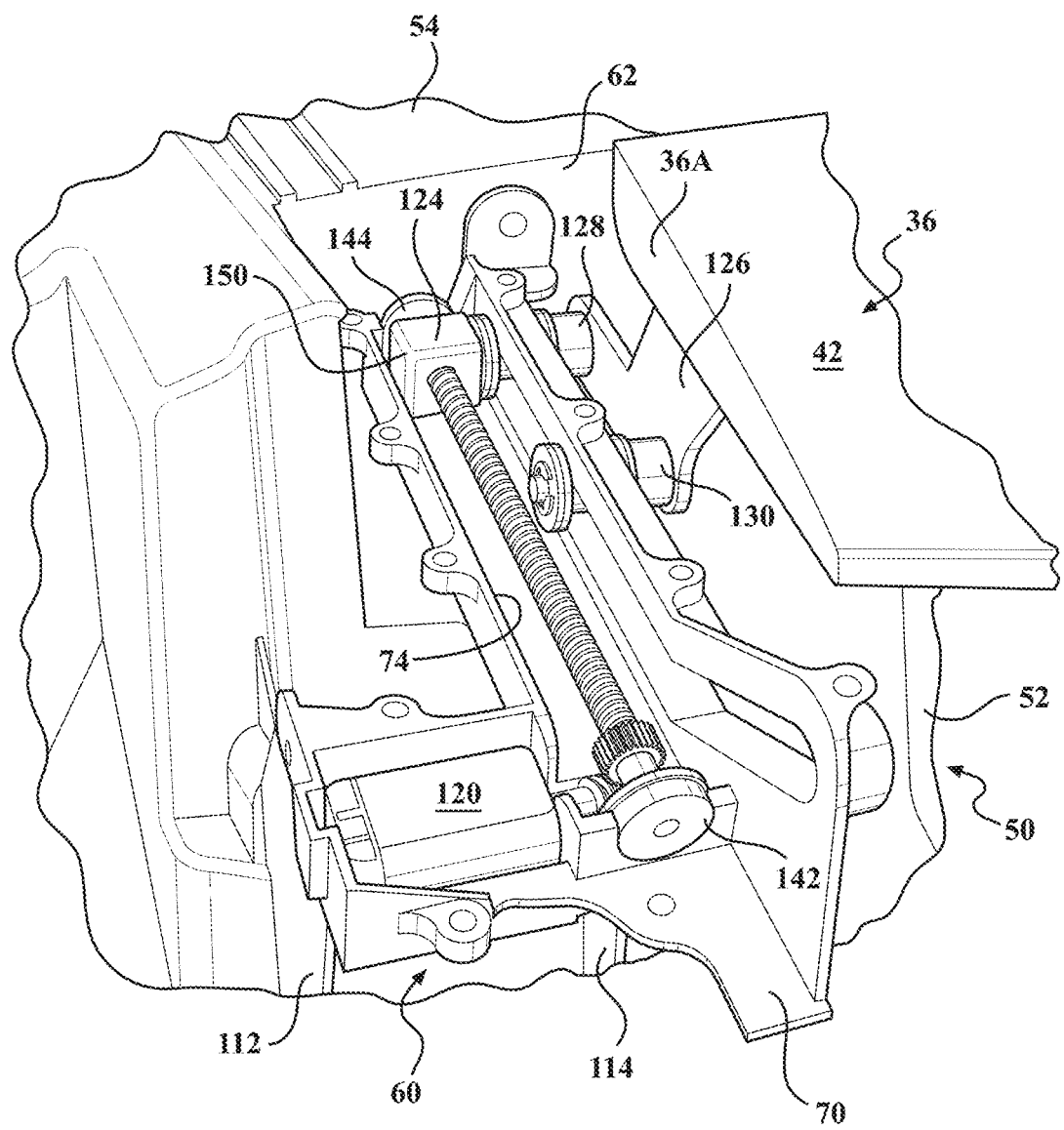
FIG. 9 is another perspective view of the driver-side drive unit with its protective cover plate removed and shown operably installed in the powered deployable spoiler assembly of the present disclosure.
Figure 10:
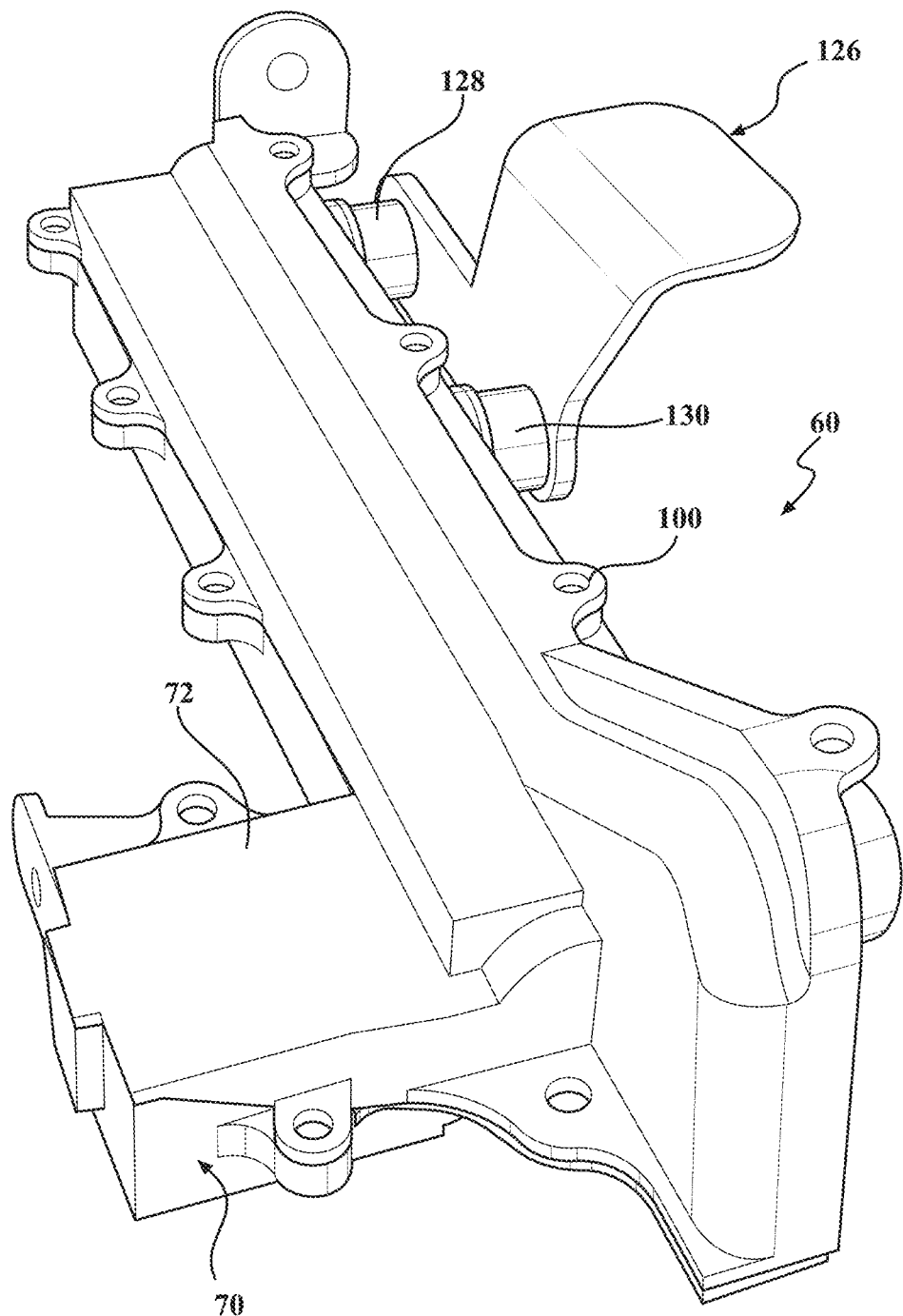
FIGS. 10-12 are perspective views of the driver-side drive unit with its mounting stanchion located in a fully retracted position corresponding to the stowed position of the rear spoiler.
Figure 11:
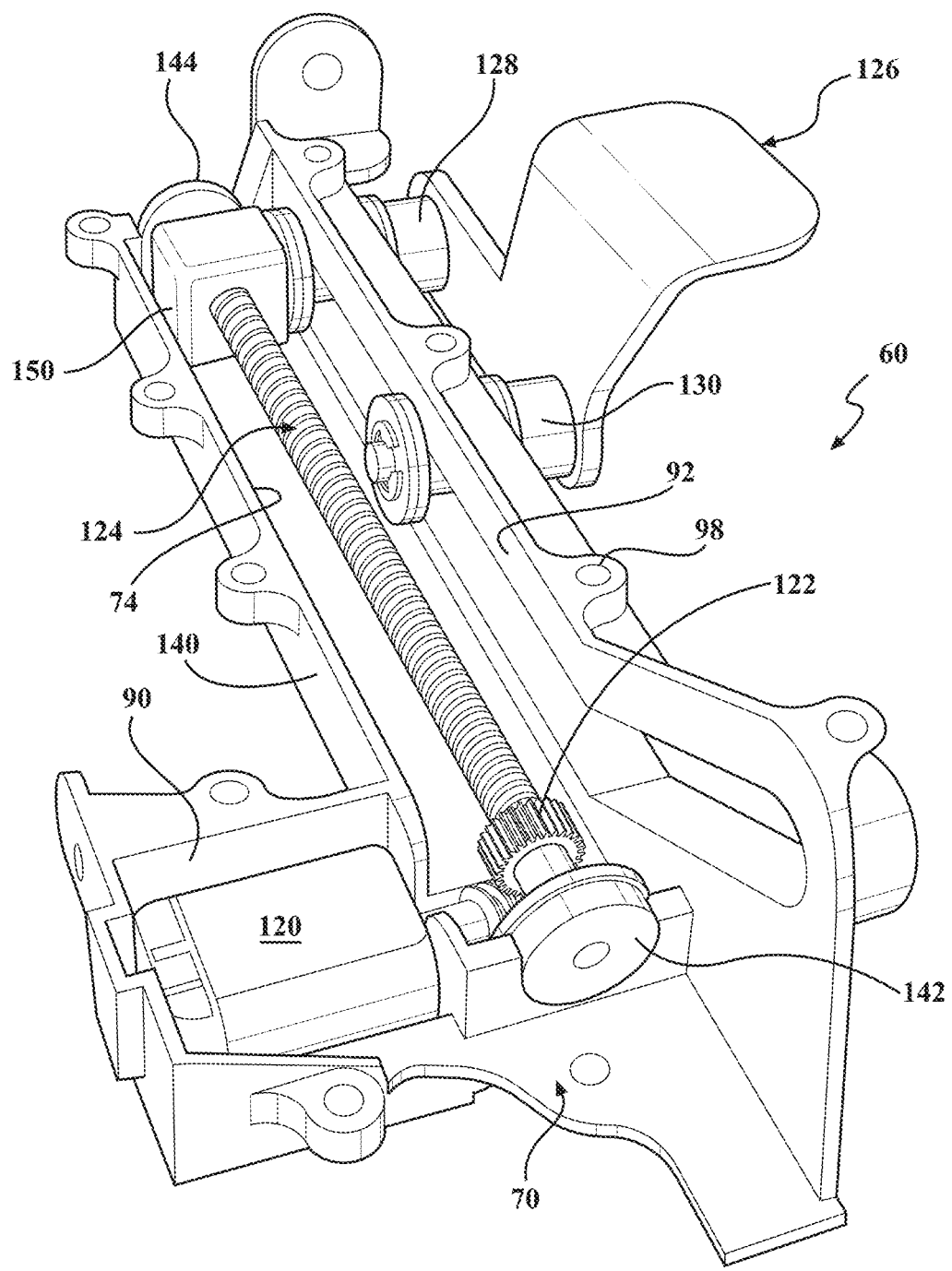
Figure 12:
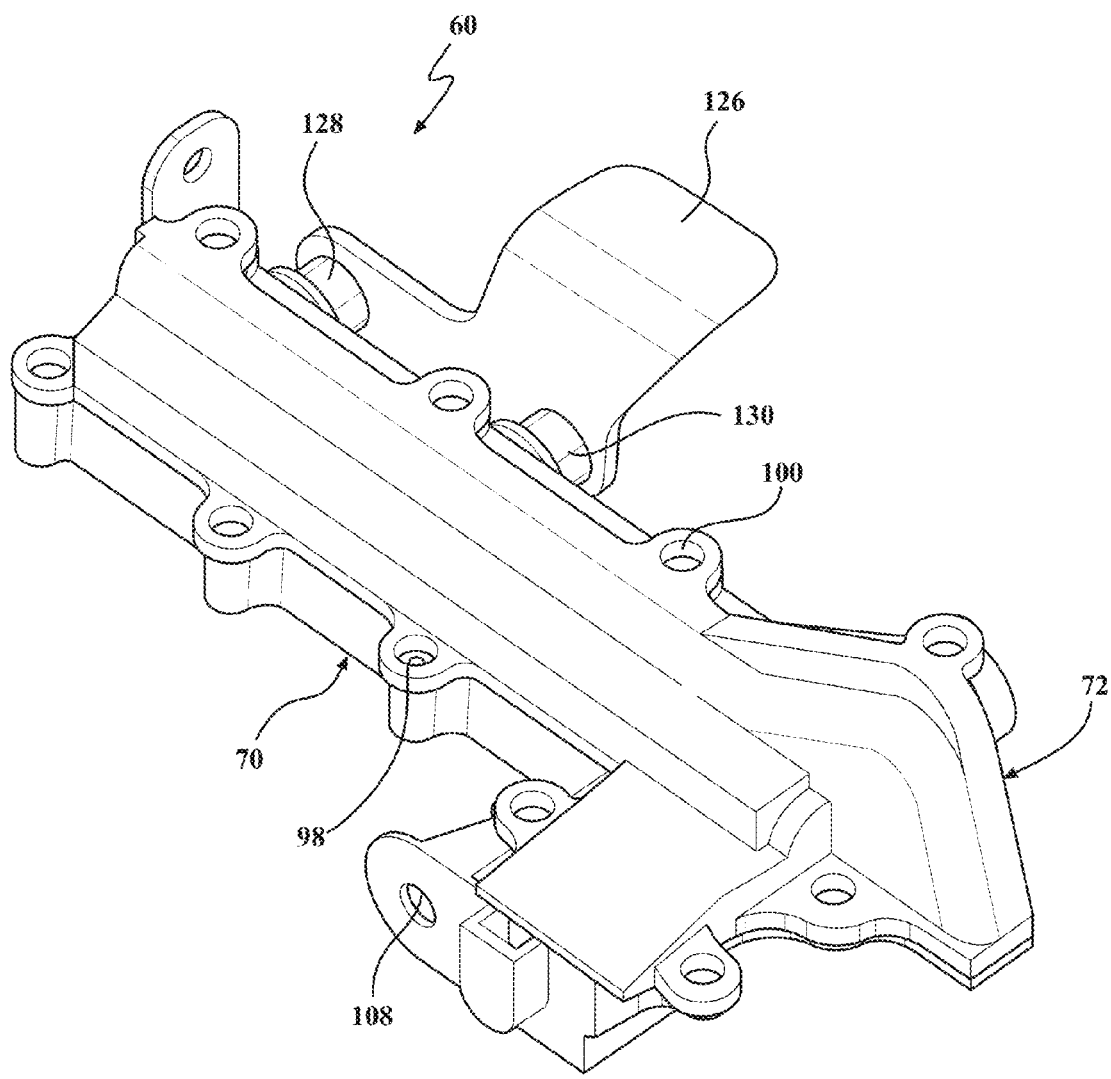

Housing 70 also includes one or more mounting apertures 108 formed through end flange segment 88 and one or more mounting apertures 110 (see FIGS. 21-23) formed through inner flange segment 80. As best shown in FIGS. 8 and 9, an outer mounting bracket 112 and an inner mounting bracket 114 are provided within support chamber 62 of driver-side mounting section 54 of mounting panel 50 and are located to permit suitable fasteners, such as threaded bolts 116 (FIG. 8) to pass through apertures 108, 110 for securely locating and fixing driver-side drive unit 60 therein. Plate segments 76 and 82 of housing 70 may be supported on alignment surfaces provided within support chamber 62.

Figure 15:
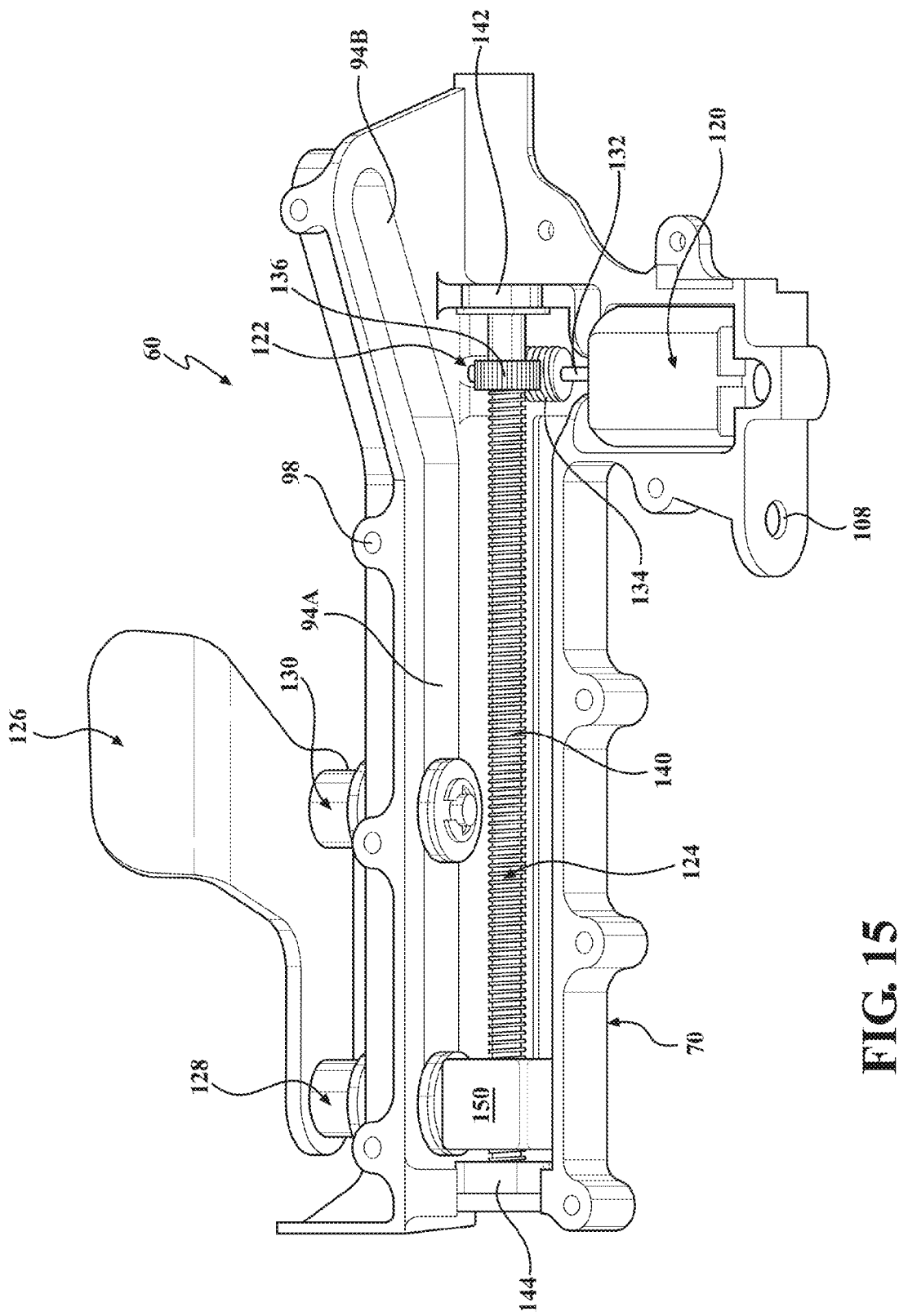
Figure 16:
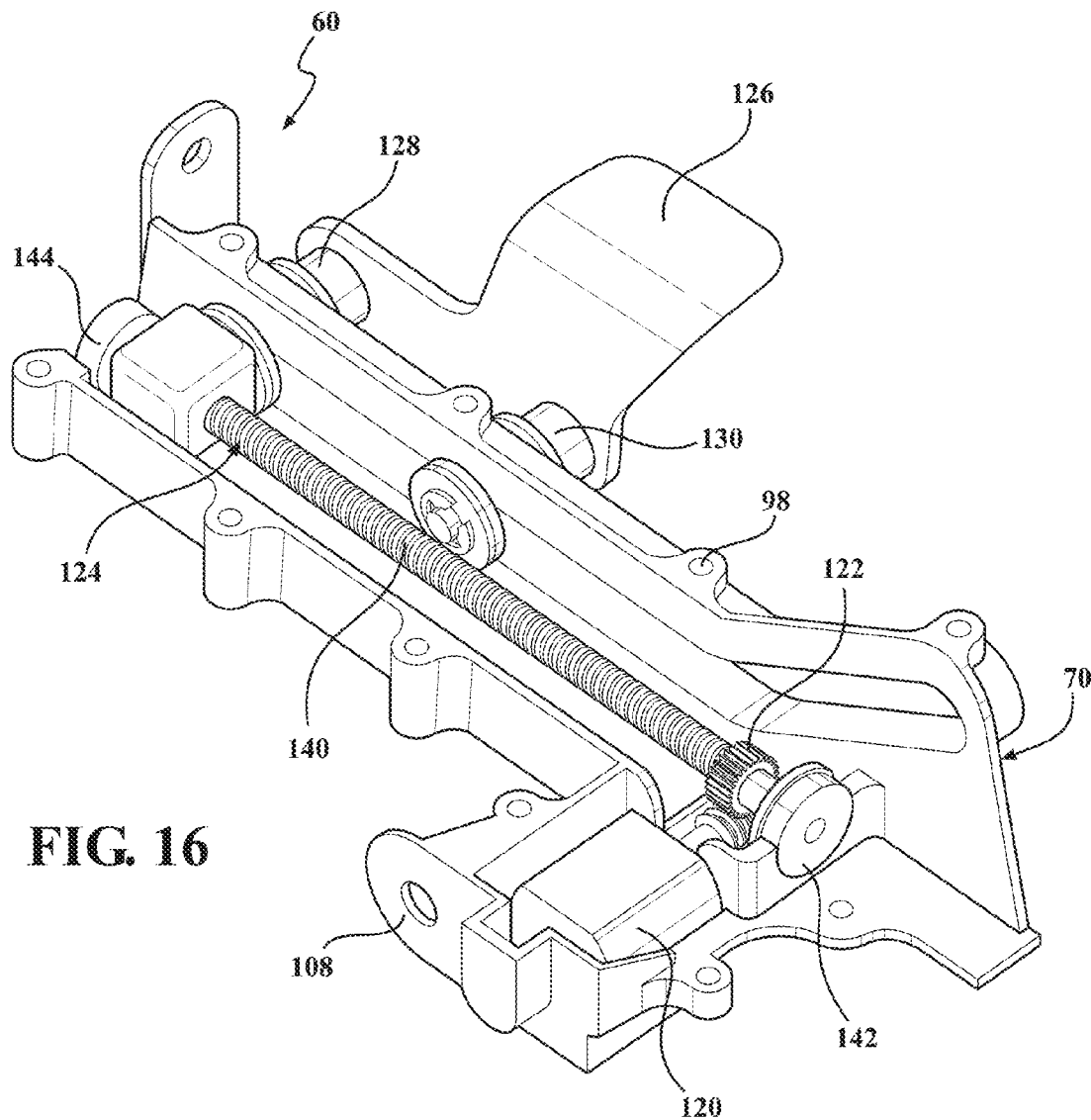
Figure 17:
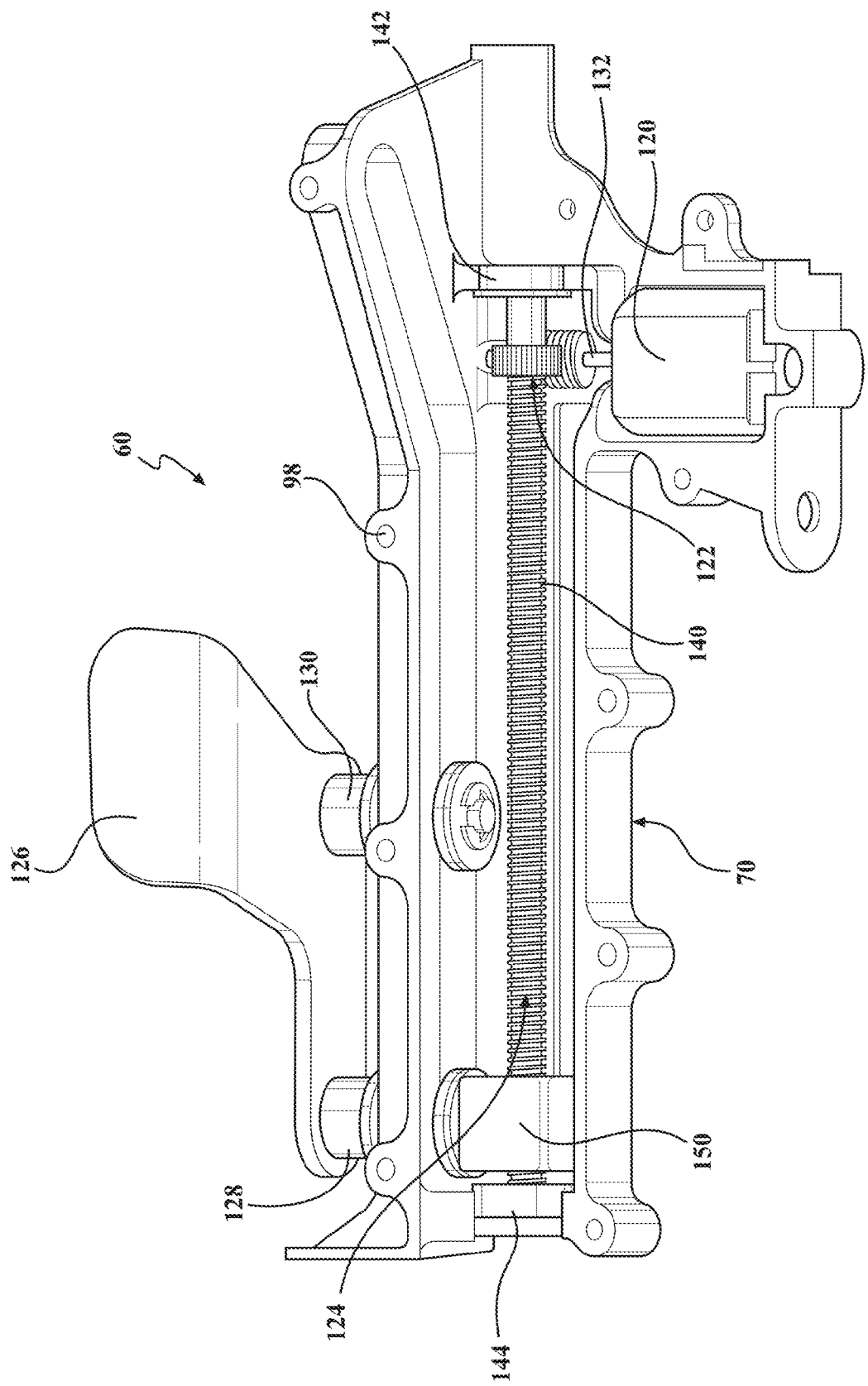
Figure 18:
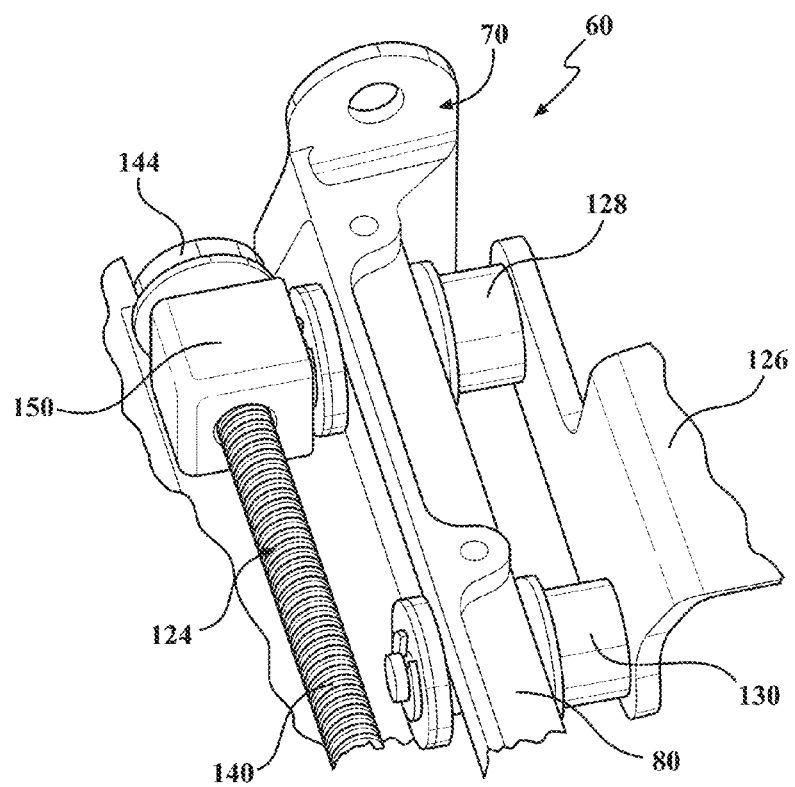
FIG. 18 is a partial view of the driver-side drive unit showing its spindle driver components in greater detail.
Figure 19:
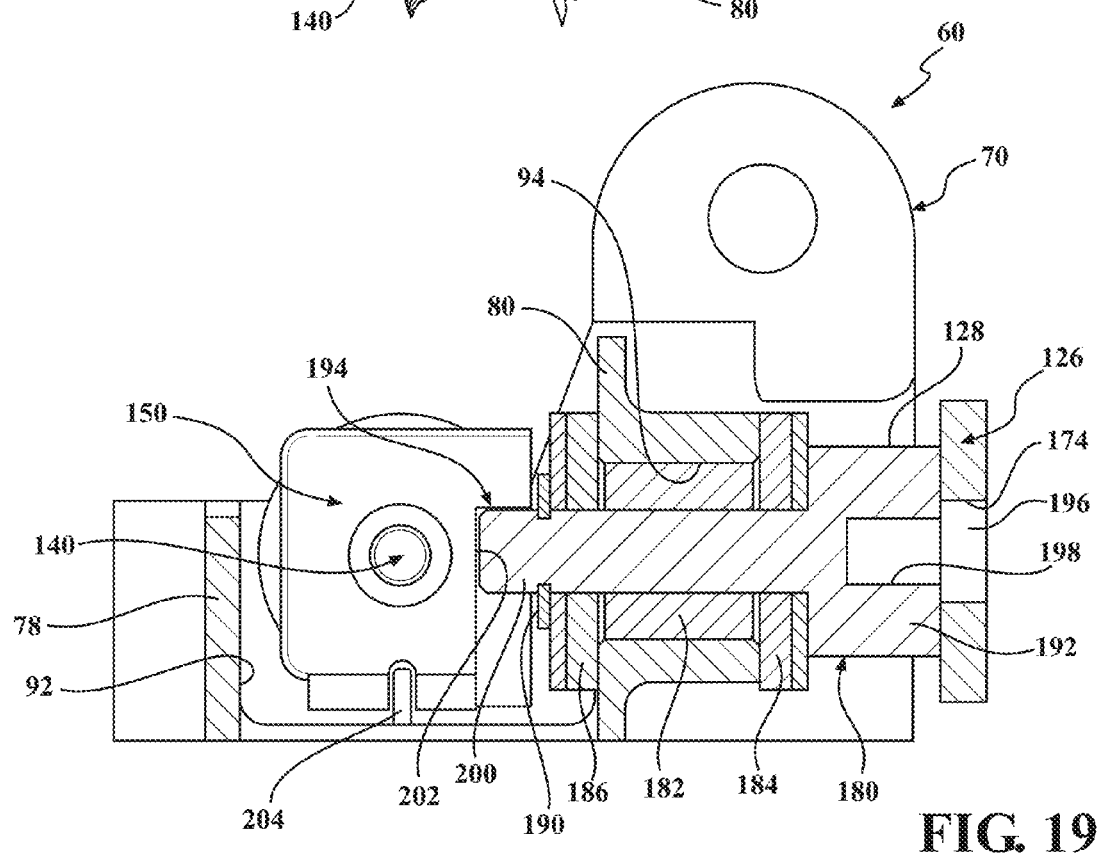
FIG. 19 is a sectional view taken generally through the spindle drive components of the driver-side drive unit.

Driver-side drive unit 60 is also shown to include an electric motor 120, a reduction gearset 122, a spindle drive assembly 124, a stanchion 126, and a pair of first and second follower assemblies 128, 130. Motor 120 is shown located in motor cavity 90 of housing 70 and includes a rotary motor shaft 132 (FIG. 15). Reduction gearset 122 is shown, in this non-limiting example, as a worm gearset including a worm gear 134 fixed for common rotation with motor shaft 132 and a worm wheel 136 meshed with worm gear 134. Worm wheel 136 is fixed for common rotation with an elongated leadscrew 140 which is associated with spindle drive assembly 124. A first end of leadscrew 140 is rotatably supported by a suitable thrust/radial bearing assembly 142 that is mounted in a bearing boss formed between transverse flange segment 86 and a mating portion of cover 72. Likewise, a second end of leadscrew 140 is rotatably supported by another thrust/radial bearing assembly 144 that is mounted in another bearing boss formed between housing 70 and cover 72.

Figure 13:
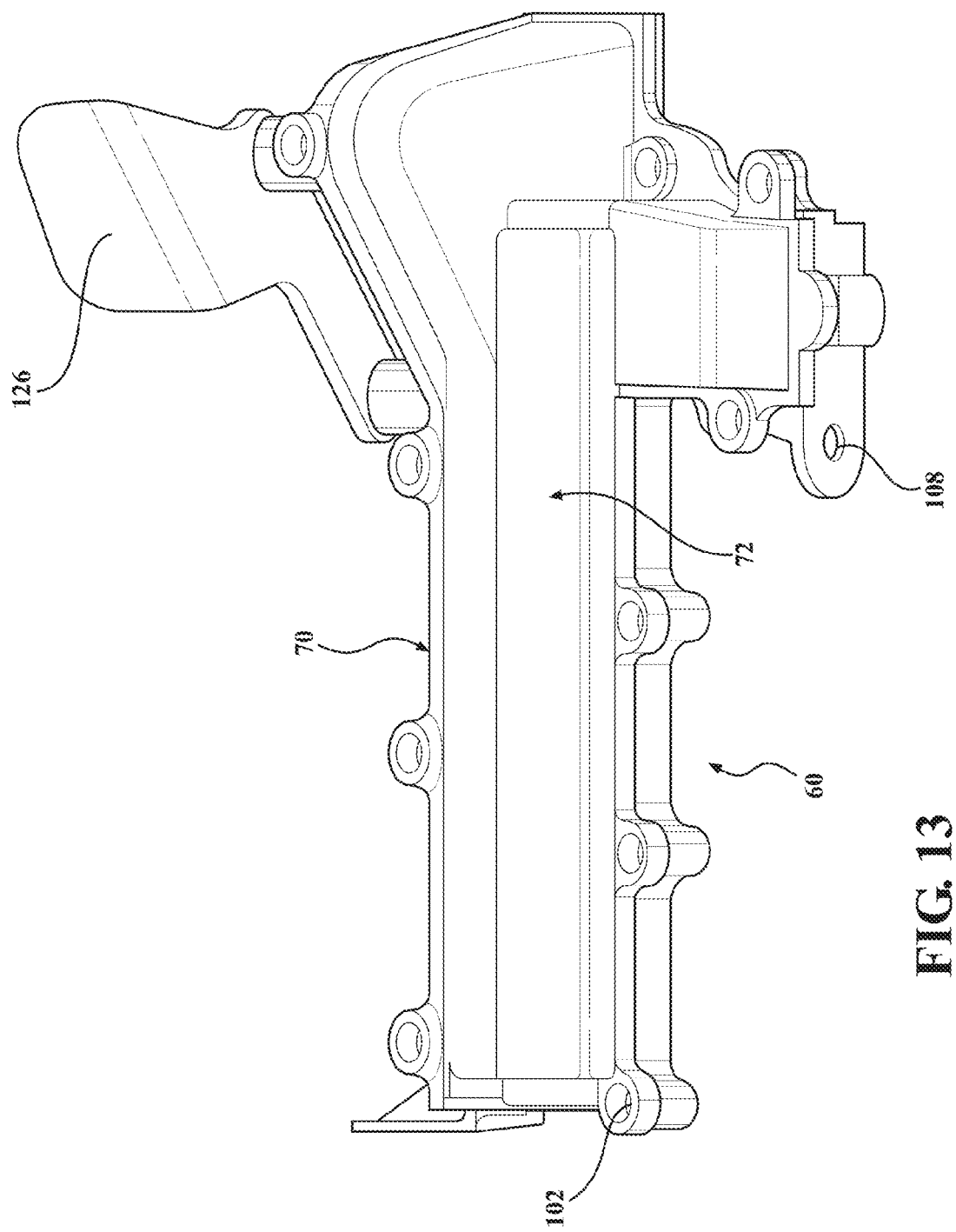
FIG. 13 is a pictorial view of the driver-side drive unit with its mounting stanchion located in a fully extended position corresponding to the second deployed position of the rear spoiler.
Figure 14:
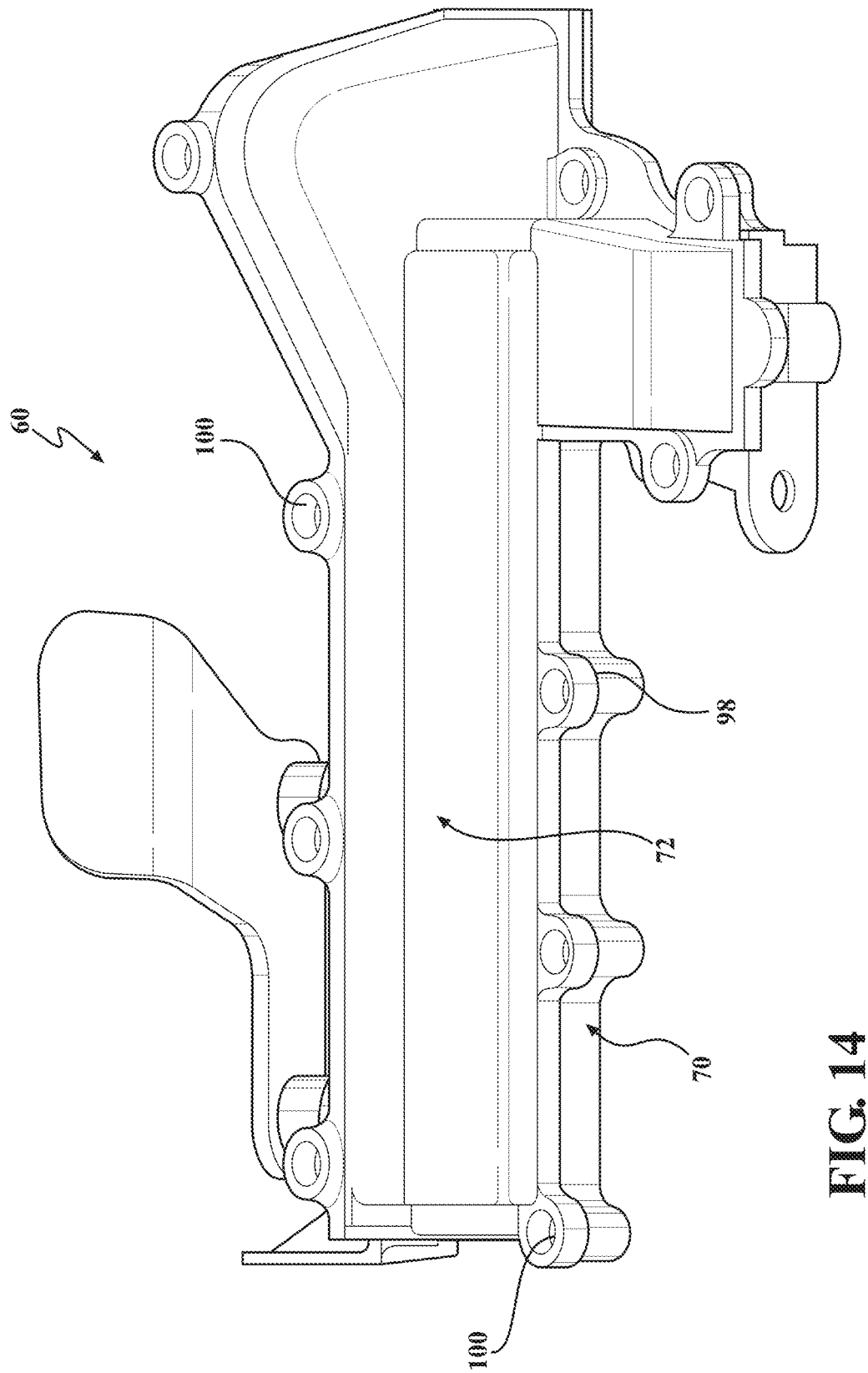
FIGS. 14-17 are additional pictorial views of the driver-side drive unit with its mounting stanchion located in the fully retracted position.
Figure 20:
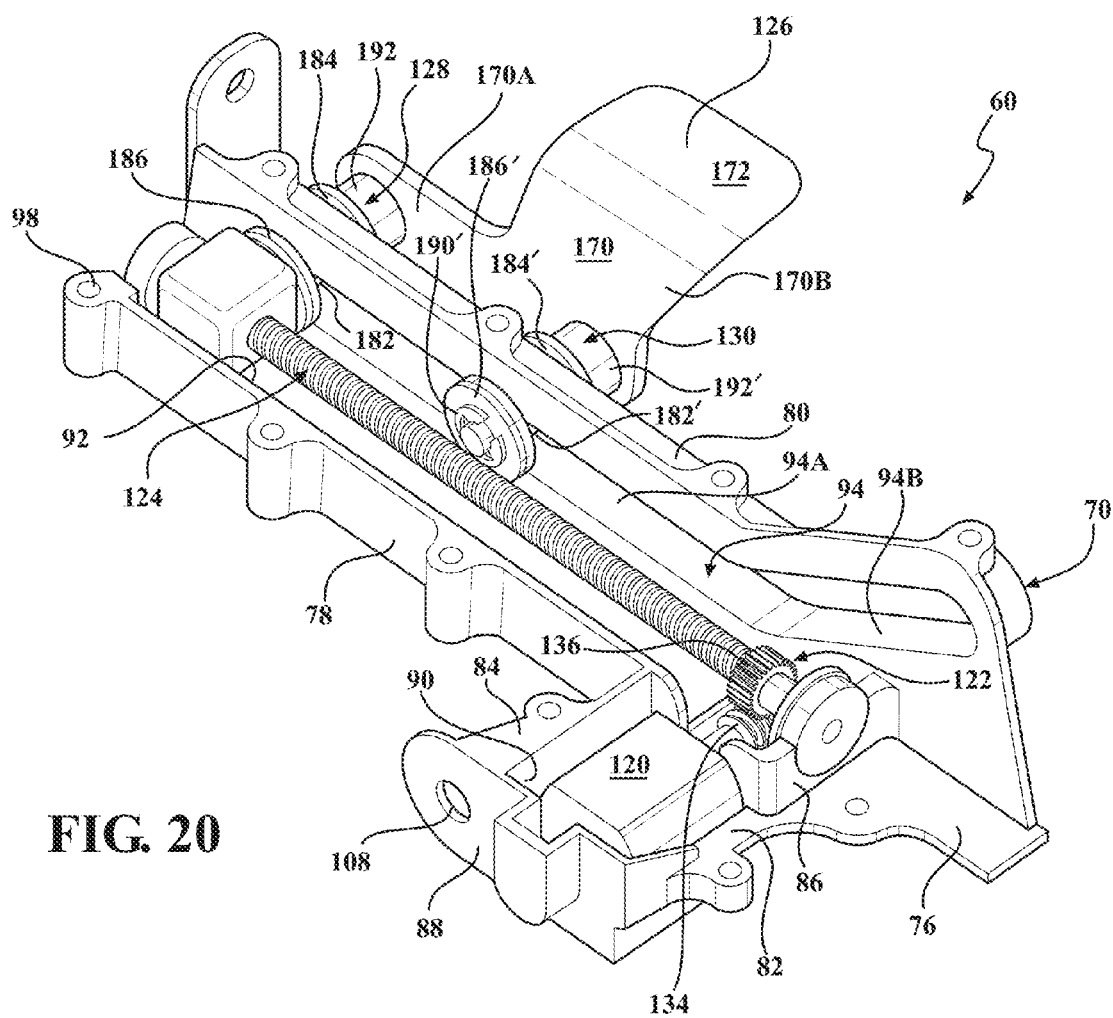
FIGS. 20 and 21 are additional pictorial views showing the components of the driver-side drive unit in greater detail.

An internally-threaded drive nut 150 associated with spindle drive assembly 124 is in threaded engagement with an externally-threaded portion of leadscrew 140. As such, rotation of leadscrew 140 in a first rotary direction will cause drive nut 150 to axially translate within spindle drive cavity 92 in a first linear direction from a fully extended position on leadscrew 140 relative to motor 120 (FIGS. 9, 11, 15-18, 20, 22, and 25) toward a fully retracted position on leadscrew 140 relative to motor 120 (FIGS. 13 and 23). In contrast, rotation of leadscrew 140 in a second rotary direction will cause drive nut 150 to axially translate in the opposite second linear direction. For purposes of clarity, the first linear direction of axial travel is from left to right when viewed as shown in FIG. 20 while the second linear direction is right to left in FIG. 20. As is understood, rotation of motor shaft 132 in a first rotary direction results in rotation of leadscrew 140 in its first rotary direction while rotation of motor shaft 132 in a second rotary direction results in rotation of leadscrew 140 in its second rotary direction.

Figure 21:
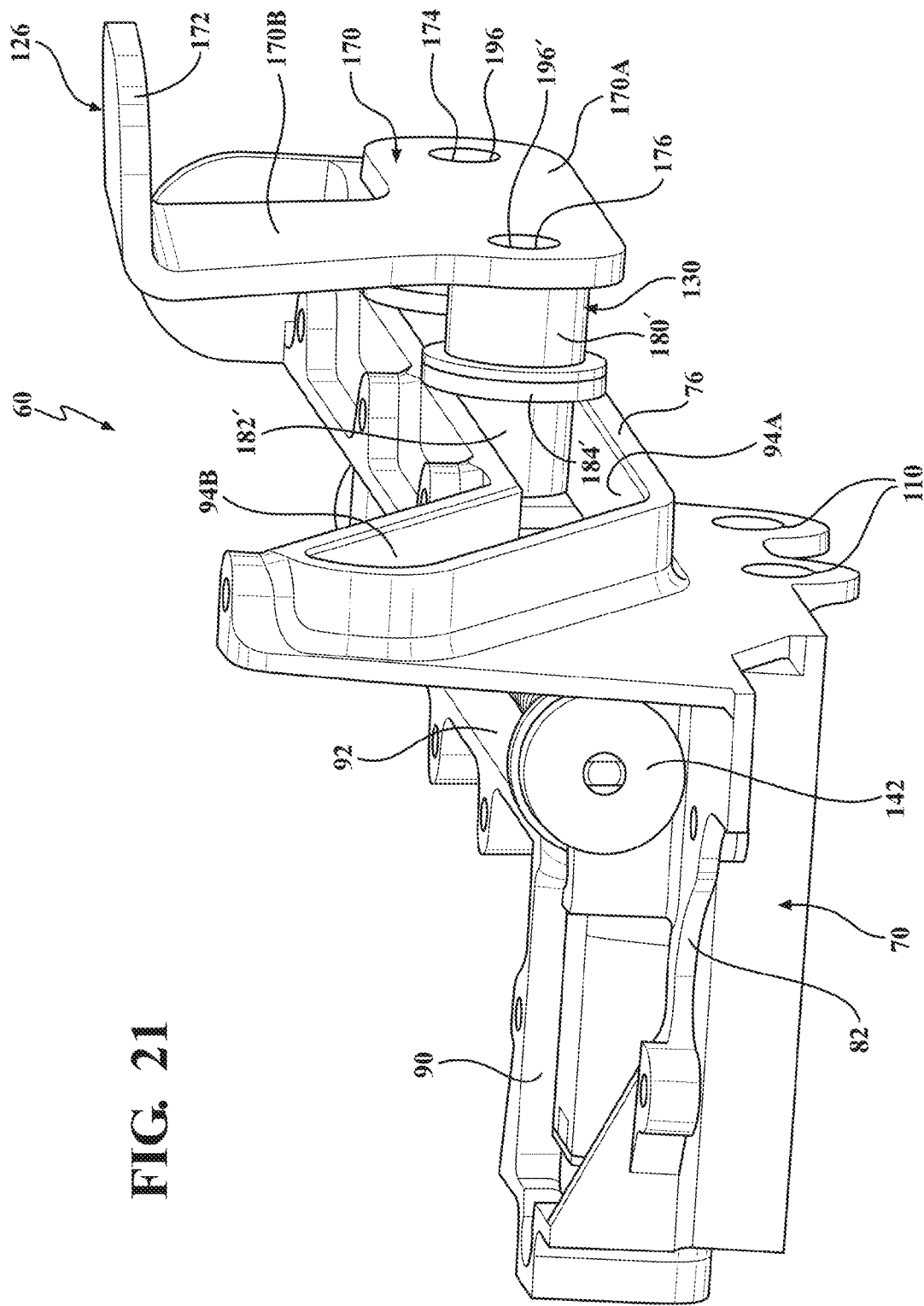
Figure 24:
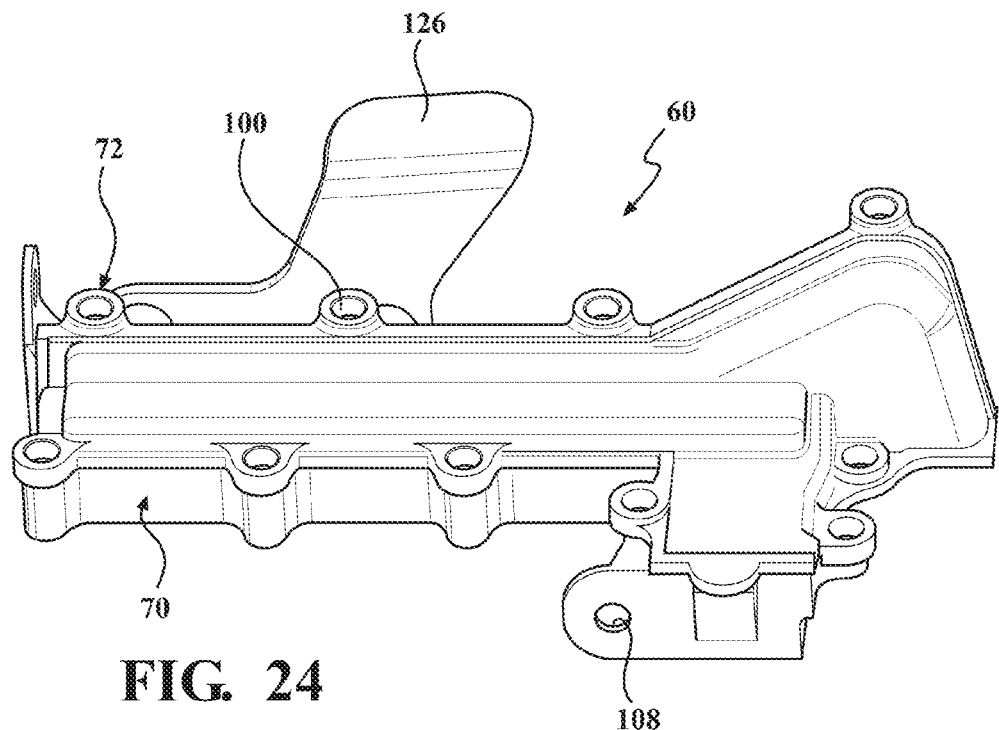
Figure 25:
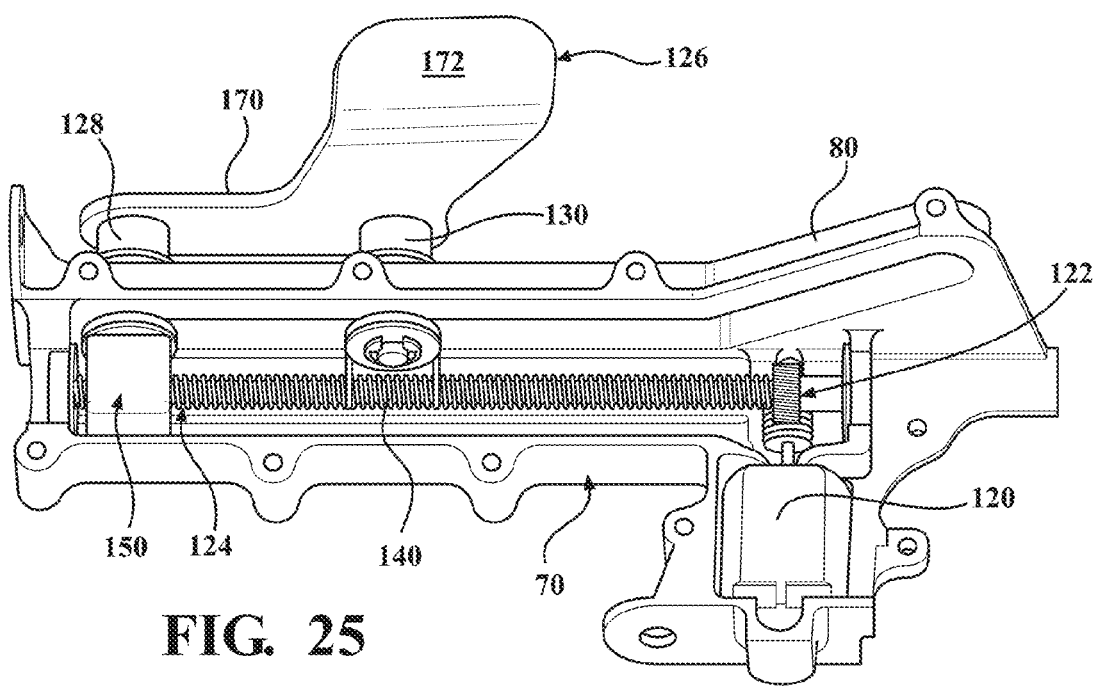

Stanchion 126 is a rigid mounting bracket having a plate segment 170 and a transverse mount segment 172 (FIG. 20). Mount segment 172 is adapted to be rigidly secured to first end segment 42 of spoiler panel 36 using any suitable fastening method including, without limitations, fasteners, welding, etc. Plate segment 170 of stanchion 126 is boot-shaped and includes a foot portion 170A and a leg portion 170B interconnecting foot portion 170A to mount segment 172. Foot portion 170A includes a pair of spaced axle bores 174, 176' (FIG. 21). As best seen from FIG. 19, first follower assembly 128 includes an axleshaft 180, a roller 182, a pair of washers 184, 186 and a retaining ring 190. Axleshaft 180 includes a cylindrical head segment 192 and a smaller diameter shaft segment 194. A threaded fastener 196 passes through axle bore 174 in foot portion 170A of stanchion 126 and is secured in a threaded aperture 198 formed in head segment 192 of axleshaft 180. Roller 182 is rotatably supported on shaft segment 194 of axleshaft 180 and is positioned within and in rolling engagement with guide slot 94 of housing 70. First washer 184 is shown disposed between a planar face surface of head segment 192 and a planar inner face surface of inner flange 80. Second washer 186 is shown disposed between a planar outer face surface of inner flange 80 and retaining ring 190 which, in turn, is secured in a groove formed in a portion of shaft segment 194 extending through guide slot 94. A terminal end 200 of shaft segment 194 is retained in a drive aperture 202 formed in a drive nut 150. Thus, axial travel of drive nut 150 in response to rotation of leadscrew 140 causes concurrent axial travel of stanchion 126 due to roller 182 moving within guide slot 94. An anti-rotation feature 204 (FIG. 19) prevents rotation of drive nut 150 within spindle cavity 92 and includes a guide rail extending into a slot formed in drive nut 150. The components of second follower assembly 130 are shown best in FIGS. 20 and 21 with primed numerals. As is apparent, second follower assembly 130 is generally configured to be similar to first follower assembly 128 with its roller 182' disposed within guide slot 94 and its axleshaft 180' having a head segment 192' fixed via a threaded fastener 196' passing through axle bore 176 in foot portion 170A of stanchion 126.

As noted, passenger-side drive unit 64 is identical, yet mirror-imaged in construction, to that of driver-side unit 60 and has its stanchion 126' fixedly secured to end segment 44 (FIG. 6) of spoiler panel. Thus, coordinated control of the electric motors 120, 120' associated with both drive units 60, 64 results in movement of spoiler panel 36 between its three (3) distinct operational positions. When the drive nut 150, 150' of each drive unit 60, 64 is located in its fully extended position on the leadscrew 140, 140', stanchions 126, 126' are located in their fully retracted positions with guide slots 94, 94' such that spoiler panel 36 is located in its Stowed position (FIGS. 1 and 2). In this position, the roller 182, 182' of each first follower assembly 128, 128' engages a terminal end surface of first guide slot segment 94A, thereby preventing further retraction of spoiler panel 36. When the vehicle operating conditions warrant movement of spoiler panel 36 to its Aero position, each motor 120, 120' is energized to rotate leadscrews 140, 140' in the first rotary direction and cause drive nuts 150, 150' and stanchions 126, 126' to move axially within the first slot sections of guide slots 94, 94' until the second follower assembly 130, 130' is located at the junction of open ends of the first slot section and the second slot position. The angulation of the first slot section of guide slots 94, 94' will dictate whether translation of spoiler panel 36 is strictly axially directed or whether a slight amount of radial directed (i.e., lift) movement of spoiler panel 36 occurs. This allows the specific orientation of the spoiler panel 36 (relative to ground) to be designed to provide optimized drag reduction. As will be understood, further rotation in the first rotary direction of leadscrews 140, 140' will cause both roller assemblies to enter the second slot section of guide slots 94, 94', thereby moving spoiler panel 36 to its Sport position. Likewise, the angulation and length of second slot section of guide slots 94, 94' will dictate the extent of axial translation and angular tilt of spoiler panel 36 to optimize the downward force generated to provide enhanced tractive control. The terminal end of the second slot section of guide slots 94, 94' limits further movement of spoiler panel 36 beyond its Sport position.

Figure 26:
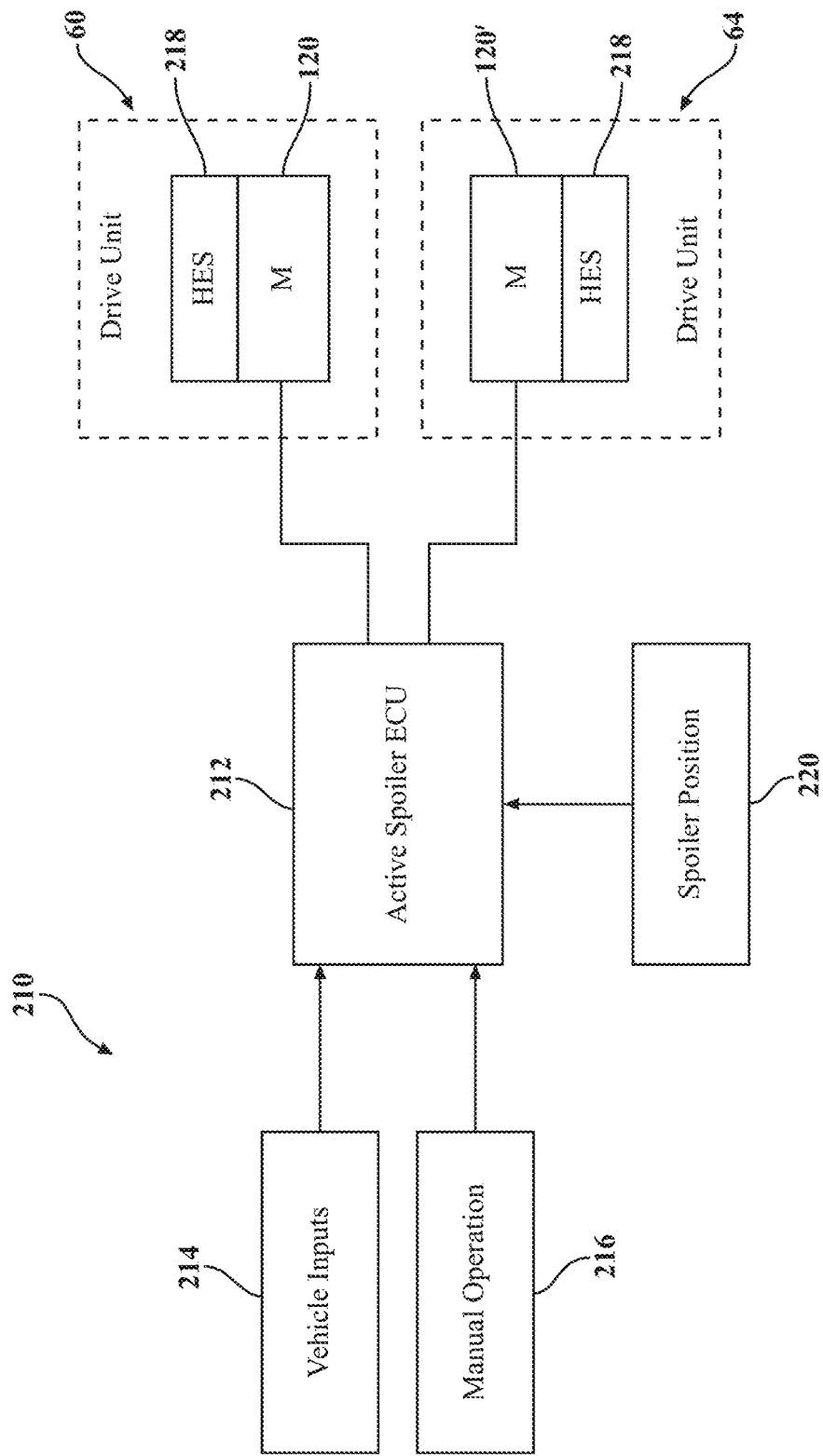
FIG. 26 is a schematic view of a closed loop control system operable for controlling coordinated actuation of the drive-side drive unit and the passenger-side drive unit.

Referring now to FIG. 26, a closed loop control system 210 is diagrammatically shown to include an Active spoiler ECU (electronic control unit) 212, vehicle inputs 214, a manual switch 216, driver-side drive unit 60 and passenger-side drive unit 64. Since the construction and function of second drive unit 64 was stated to be substantially similar, if not identical, to that of first drive unit 60, it is schematically shown to include electric motor 120' configured to control movement of stanchion 126' via use of spindle drive assembly 124'. It is noted that each motor 120, 120' is provided with a Hall effect sensor (HES) 218, 218'. Specifically, a Hall effect sensor 218, 218' may be coupled to each motor 120, 120' for detecting a position of each motor 120, 120'. It should be appreciated that other sensors can be used to detect the position of each motor 120, 120', such as, but not limited to an optical position sensor, or rotary encoder. A spoiler position sensor 220 may also be used in control system 210 for detecting the position of spoiler panel 36. Some of the vehicle inputs 214 may include, without limitation, electrical power, motor torque, engine mode, vehicle speed, transmission mode, environmental conditions and airflow characteristics over roof 16 of vehicle 12. Hall effect sensors 218, 218' provide independent position control for each drive unit and permit motors 120, 120' to be independently controlled to cooperatively work to move spoiler panel 36 precisely between its three distinct positions (i.e., Stowed position, Aero position, and Sport position).

Control system 210 is operable to electronically synchronize operation of motors 120, 120' to accurately control movement of spoiler panel 36 between its three positions. Based on one example operational configuration, the time for deployment of spoiler panel 36 from its Stowed position into its Aero position is about 1-3 seconds and is initiated when, for example, the vehicle speed exceed 80 kph. Likewise, the time for deployment of spoiler panel 36 forms its Aero position into its Sport position is about 3-4 seconds and is initiated when, for example, the vehicle speed exceeds 128 kph. As seen in FIG. 3, deployment of spoiler panel 36 to its Aero position is configured to reduce drag while the fully deployed Sport position of FIG. 4 is configured to generate a downward force to improve tractive performance at high vehicle speeds. The angulation profile of slot section 94A is configured to control movement of spoiler panel 36 between the Stowed and Aero positions while the angulation profile of slot section 94B is configured to control movement of spoiler panel 36 between its Aero and Sport positions.

The use of a pair of matched power-operated drive units capable of providing both extension and angular movement of the rear spoiler provides a simple and compact powered rear spoiler assembly capable of movement between at least three distinct operational positions. However, the use of the guide and roller arrangements for each of the drive units also permits a range of deployed positions in addition to the Aero and Sport positions disclosed. Accordingly the control system permits "adaptive" location of the spoiler panel anywhere between the fully retracted (Stowed) and the fully-extended (Sport) positions based on any combination of vehicle inputs so as to optimize the aerodynamic efficiency of the motor vehicle. In addition, while the electric motors are shown offset relative to the spindle drive devices, those skilled in the art will appreciate that an in-line motor-gearbox/spindle drive arrangement is also within the scope of this disclosure. Furthermore, any other rotary-to-linear conversion device can be used between the electric motor and the follower/stanchion assembly to facilitate controlled translation thereof. The present disclosure also contemplates using alternative drive units utilizing hydraulic or pneumatic mechanisms, for example, to move the follower assembly in the guide slot.

While the present disclosure describes the powered deployable spoiler assembly as employing a pair of laterally-spaced and electronically synchronized drive units, those skilled in the art will recognize that the present disclosure also covers an alternative powered deployable spoiler assembly having a single power-operated drive unit located centrally to the spoiler panel. The single drive unit world integrate the components previously described in association with drive units 60, 64 and function to control deployment of the spoiler panel from its Stowed position to at least one deployed position, and preferably at least two distinct deployed positions.

In view of the above, the present disclosure is directed to a powered deployable spoiler assembly or active spoiler assembly and its control system having a spoiler panel fixed in relation to at least one stanchion, with the stanchion connected by at least two pivot points to a guide device. The guide device provides a guide path for the stanchion pivot points from a Stowed spoiler position to a Sport spoiler position. In the Sport spoiler position, the spoiler panel is angulated to generate a downward force on the vehicle to reduce lift and provided enhanced tractive control when a predetermined vehicle speed has been exceeded. The angulated orientation of the spoiler panel is provided via a combination of initial extension of the spoiler panel rearwardly relative to the closure member or vehicle's body and a subsequent upward tilting movement of the spoiler panel relative to the closure member or vehicle's body. In addition to the above, an intermediate spoiler position, referred to as the Aero spoiler position is established by the initial extension of the spoiler panel 36 relative to the closure member or vehicle's body. This intermediate Aero spoiler position is established by the guide path of the guide device and, in particular, is provided by a first guide slot within which the stanchion pivots travel. A second guide slot connected to the end of the first guide slot is configured to generate the tilting movement as the stanchion pivots continue to travel thereon to the Sport spoiler position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be orientated "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A powered deployable spoiler assembly for use with a motor vehicle, comprising:
    a support member adapted to be mounted to the motor vehicle;
    a spoiler panel disposed in a recessed segment of said support member, wherein said recessed segment is exterior to an outer body portion of the motor vehicle; and
    a power-operated drive unit interconnecting said spoiler panel to said support member and operable to move said spoiler panel between a stowed position relative to said support member and at least one deployed position relative to said support member, said drive unit including a housing fixed to said support member and defining a guide slot, a stanchion fixed to said spoiler panel, a follower assembly fixed to said stanchion and disposed for movement within said guide slot, said follower assembly having a roller rotatably supported on a shaft segment positioned within rolling engagement with said guide slot and a retaining ring secured in a groove formed in a position of said shaft segment extending through the guide slot, an electric motor having a rotary motor shaft, and a rotary-to-linear conversion mechanism for converting rotation of said motor shaft into translation of said follower assembly within said guide slot to move said spoiler panel between its stowed and deployed positions.

2. The powered deployable spoiler assembly of claim 1 wherein said rotary-to-linear conversion mechanism is a spindle drive device having a leadscrew rotatably driven by said motor shaft and a drive nut in threaded engagement with said leadscrew, said drive nut being fixed to said follower assembly.

3. The powered deployable spoiler assembly of claim 2 wherein said housing defines a motor cavity and a spindle drive cavity, wherein said electric motor is disposed within said motor cavity and said spindle drive device is disposed within said spindle drive cavity, wherein a pair of spaced-apart bearing assemblies rotatably support opposite ends of said leadscrew for rotation in said spindle drive cavity, and wherein an anti-rotation feature within said spindle drive cavity prevents rotation of said drive nut in response to rotation of said leadscrew.

4. The powered deployable spoiler assembly of claim 1 wherein said guide slot includes a first slot segment and a second slot segment, wherein location of said follower assembly in close proximity to a terminal end of said first slot segment locates said stanchion in a retracted position so as to locate said spoiler panel in its stowed position, and wherein location of said follower assembly in close proximity to a terminal end of said second slot segment locates said stanchion in an extended position so as to locate said spoiler panel in its deployed position.

5. The powered deployable spoiler assembly of claim 4 wherein said second slot segment of said guide slot is angulated relative to said first slot segment such that said spoiler panel is disposed in a tilted orientation relative to said support member when located in its deployed position.

6. The powered deployable spoiler assembly of claim 5 wherein said at least one deployed position includes a first deployed position and a second deployed position, and said spoiler panel is moveable to said first deployed position located between said stowed position and said second deployed position, said first deployed position being established when said follower assembly is located at an intersection of said first and second slot segments of said guide slot.

7. The powered deployable spoiler assembly of claim 6 wherein said spoiler panel is operable in said first deployed position to reduce drag and said spoiler panel is operable in said second deployed position to reduce lift of the vehicle and generate a downwardly directed force.

8. The powered deployable spoiler assembly of claim 1 wherein said stanchion is fixed to a first end segment of said spoiler panel, wherein a second power-operated drive unit includes a second stanchion fixed to a second end segment of said spoiler panel, a second follower assembly fixed to said second stanchion and disposed for movement with a second guide slot formed in a second housing that is fixed to said support member, a second electric motor and a second rotary-to-linear conversion mechanism for converting rotation of a second motor shaft into translation of said second follower assembly in said second guide slot, wherein said first and second electric motors are controlled to move said spoiler panel between its stowed and deployed positions.

9. The powered deployable spoiler assembly of claim 1 wherein said support member is associated with a rear closure member configured for attachment to a body portion of the motor vehicle and which is moveable between a closed position and an open position.

10. The powered deployable spoiler assembly of claim 9 wherein said rear closure member is a pivotable liftgate, and wherein said support member and said liftgate define a liftgate module configured for attachment to the body portion of the motor vehicle.

11. The powered deployable spoiler assembly of claim 1 wherein said support member is adapted to be mounted to a roof portion of the motor vehicle, and wherein a moveable closure member is attached to a body portion of the motor vehicle in proximity to said support member.

12. The powered deployable spoiler assembly of claim 1 wherein said support member defines at least one recessed channel for permitting air flowing over the vehicle to flow under said spoiler panel and through said at least one recessed channel to be discharged therefrom.

13. The powered deployable spoiler assembly of claim 1 further including a control system having at least one position sensor for detecting a position of one of said electric motor and said spoiler panel, and an active spoiler control unit for controlling movement of said spoiler panel in response to a position signal from said position sensor and a vehicle signal from at least one vehicle input.

14. The powered deployable spoiler assembly of claim 13 wherein said at least one deployed position includes a first deployed position and a second deployed position with said first deployed position being located between said stowed position and said second deployed position, and wherein said vehicle input includes a vehicle speed and said power-operated drive unit is arranged to move said spoiler panel between said stowed position and said first deployed position to provide aerodynamic assistance at a first vehicle speed and to move said spoiler panel to said second deployed position to provide augmented aerodynamic assistance at a second vehicle speed that is higher than said first vehicle speed.

15. A powered deployable spoiler assembly for use with a motor vehicle, comprising:
 a support member configured to be mounted to the motor vehicle;
 a spoiler panel disposed in a recessed segment of said support member, wherein said recessed segment is exterior to an outer body portion of the motor vehicle;
 a pair of power-operated drive units interconnecting opposite ends of said spoiler panel to said support member and operable to move said spoiler panel from a stowed position within said recessed segment of said support member to a deployed position extending from said recessed segment of said support member, each of said power-operated drive units including a housing configured to be secured to said support member and defining an elongated guide slot, a stanchion secured to a corresponding end of said spoiler panel, a follower assembly mounted to said stanchion and disposed for movement within said guide slot, said follower assembly having a roller rotatably supported on a shaft segment positioned within and in rolling engagement with said guide slot and a retaining ring secured in a groove formed in a position of said shaft segment extending through the guide slot, and a powered actuator for translating said stanchion relative to said housing for moving said spoiler panel between its stowed and deployed positions; and
 a control system for controlling actuation of said powered actuator in response to an operating characteristic of the motor vehicle so as to actively control movement of the spoiler panel.

16. The powered deployable spoiler assembly according to claim 15 wherein said each of said powered actuators includes an electric motor and a rotary-to-linear conversion mechanism for causing translation of said stanchions in response to rotation of a rotary motor output.

17. The powered deployable spoiler assembly according to claim 15 wherein each of said guide slots include a first slot segment and a second slot segment, wherein positioning of said follower assembly in proximity to a terminal end of said first slot segment functions to locate said spoiler panel in its stowed position, and wherein positioning of said follower assembly in proximity to a terminal end of said second slot segment functions to locate said spoiler panel in its deployed position.

18. The powered deployable spoiler assembly according to claim 17 wherein said second slot segment of some guide slots is angulated relative to said first slot segment such that said spoiler panel is disposed in a tilted orientation relative to said support member when located in its deployed position.

19. The powered deployable spoiler assembly of claim 18 wherein said at least one deployed position includes a first deployed position and a second deployed position, with said first deployed position located between said stowed position and said second deployed position, said first deployed position being established when said follower assembly is located at an intersection of said first and second slot segments of said guide slot.

20. The powered deployable spoiler assembly of claim 19 wherein said spoiler panel is operable in said first deployed position to reduce drag and said spoiler panel is operable in said second deployed position to reduce lift of the vehicle and generate a downwardly directed force.

* * * * *